US012231885B2

(12) United States Patent
Shi et al.

(10) Patent No.: US 12,231,885 B2
(45) Date of Patent: Feb. 18, 2025

(54) METHODS, ARCHITECTURES, APPARATUSES AND SYSTEMS FOR WTRU-TO-NETWORK RELAYS

(71) Applicant: InterDigital Patent Holdings, Inc., Wilmington, DE (US)

(72) Inventors: Xiaoyan Shi, Westmount (CA); Samir Ferdi, Kirkland (CA); Saad Ahmad, Montreal (CA); Michelle Perras, Montréal (CA); Alec Brusilovsky, Downingtown, PA (US); Guanzhou Wang, Brossard (CA)

( * ) Notice: Subject to any disclaimer, the term of this patent is extended or adjusted under 35 U.S.C. 154(b) by 111 days.

(21) Appl. No.: 17/774,716

(22) PCT Filed: Nov. 6, 2020

(86) PCT No.: PCT/US2020/059530
§ 371 (c)(1),
(2) Date: May 5, 2022

(87) PCT Pub. No.: WO2021/092480
PCT Pub. Date: May 14, 2021

(65) Prior Publication Data
US 2023/0023639 A1    Jan. 26, 2023

Related U.S. Application Data

(60) Provisional application No. 63/086,436, filed on Oct. 1, 2020, provisional application No. 62/975,956, filed (Continued)

(51) Int. Cl.
*H04W 12/069* (2021.01)

(52) U.S. Cl.
CPC ................... *H04W 12/069* (2021.01)

(58) Field of Classification Search
CPC ... H04W 12/069; H04W 48/16; H04W 8/005; H04W 88/04; H04W 76/12
See application file for complete search history.

(56) References Cited

U.S. PATENT DOCUMENTS

| 2013/0298209 A1* | 11/2013 | Targali | H04W 12/06 726/6 |
| 2014/0050320 A1* | 2/2014 | Choyi | H04W 12/06 380/270 |

(Continued)

FOREIGN PATENT DOCUMENTS

| CN | 107211297 A | 9/2017 |
| CN | 109997334 A | 7/2019 |

(Continued)

OTHER PUBLICATIONS

3GPP TS 23.303 V15.1.0: Universal Mobile Telecommunications System (UMTS); LTE; Proximity-based services (ProSe); Stage 2(3GPP TS 23.303 version 15.1.0 Release 15)(Jul. 2018); 130 pages.

(Continued)

*Primary Examiner* — Juan M Guillermety
(74) *Attorney, Agent, or Firm* — Jamie T. Nguyen

(57) ABSTRACT

Systems and methods are described herein for enabling discovery and selection of a WTRU-to-network relay by a remote WTRU and handling a WTRU-to-network relay configuration update. The WTRU-to-network relay may broadcast a service type indicating that the service type is available or conditionally available based on the WTRU-to-network relay slicing configuration. The WTRU-to-network relay may update broadcasting the service type or the indication that the service type as being conditionally available based on update of the WTRU-to-network relay slicing configuration. The WTRU-to-network relay may relay traffic between one or more distinct remote WTRUs and the core (Continued)

network node via a WTRU-to-network relay. The WTRU-to-network relay may reuse an existing PDU session for relay traffic or send a PDU session establishment request to network with the requested PDU session parameters depending on if the session parameters associated with an existing PDU session match the PDU session requirements of the remote WTRU.

17 Claims, 12 Drawing Sheets

Related U.S. Application Data on Feb. 13, 2020, provisional application No. 62/957,530, filed on Jan. 6, 2020, provisional application No. 62/932,219, filed on Nov. 7, 2019.

(56) References Cited

U.S. PATENT DOCUMENTS

| | | | |
|---|---|---|---|
| 2016/0286395 A1* | 9/2016 | Adrangi | H04W 12/50 |
| 2016/0344726 A1* | 11/2016 | Stojanovski | H04W 4/10 |
| 2016/0374104 A1* | 12/2016 | Watfa | H04W 4/80 |
| 2016/0381491 A1 | 12/2016 | Watfa et al. | |
| 2017/0055149 A1* | 2/2017 | Lehtovirta | H04W 12/04 |
| 2019/0159018 A1* | 5/2019 | Basu Mallick | H04W 4/023 |
| 2019/0223008 A1 | 7/2019 | Vanderveen et al. | |
| 2020/0100088 A1* | 3/2020 | Kim | H04W 48/16 |
| 2021/0084581 A1 | 3/2021 | Yang et al. | |
| 2022/0132603 A1* | 4/2022 | Adjakple | H04W 76/14 |

FOREIGN PATENT DOCUMENTS

| | | |
|---|---|---|
| JP | 2016219955 A | 12/2016 |
| JP | 2018523950 A | 8/2018 |
| WO | WO 2018129543 A1 | 7/2018 |
| WO | WO 2019205027 A1 | 10/2019 |

OTHER PUBLICATIONS

3GPP TR 23.752 V0. 1.0 (Oct. 2019); "3rd Generation Partnership Project; Technical Specification Group Services and System Aspects; Study on system enhancement for Proximity based Services (ProSe) in the 5G System (5GS) (Release 17)"; Oct. 2019, 11 pages.

3rd Generation Partnership Project; Technical Specification Group Services and System Aspects;Study on system enhancement for Proximity based Services (ProSe) in the 5G System (5GS)(Release 17); 3GPP TR 23.752 V0.5.0 (Sep. 2020); 162 pages.

3GPP TS 23.502 V16.0.0_3rd Generation Partnership Project; Technical Specification Group Services and System Aspects;Procedures for the 5G System; Stage 2(Release 16)(Mar. 2019); 420 pages.

CATT: "New KI: Support of Network Slicing for UE-to-Network Relay", SA WG2 Meeting #135, S2-1909757 (revision of S2-190xxxx), Oct. 14-18, 2019, Split, Croatia, 1 page.

3GPP TS 23.501 V16.0.0_3rd Generation Partnership Project; Technical Specification Group Services and System Aspects; System Architecture for the 5G System; Stage 2(Release 16)(Mar. 2019); 318 pages.

Interdigital, "Solution for authorization and security with UE-to-Network relay using Remote UE network primary authentication", 3GPP Tdoc 83-202375, 3GPP TSG-SA3 Meeting #100-bis-e, e-meeting, Oct. 12-16, 2020, 3 pages.

English Language Abstract, Japanese Publication No. 2016219955, Dec. 16, 2022.

* cited by examiner

METHODS, ARCHITECTURES, APPARATUSES AND SYSTEMS FOR WTRU-TO-NETWORK RELAYS

CROSS REFERENCE TO RELATED APPLICATIONS

This is the National Stage of International Application PCT/US2020/059530, filed Nov. 6, 2020 which claims the benefit of U.S. Provisional Application No. 62/932,219, filed Nov. 7, 2019; U.S. Provisional Application No. 62/957,530 filed Jan. 6, 2020; U.S. Provisional Application No. 62/975,956 filed Feb. 13, 2020 and U.S. Provisional Application No. 63/086,436 filed Oct. 1, 2020, the contents of each of which are incorporated by reference herein.

BACKGROUND

A wireless transmit/receive unit (WTRU)-to-network relay may establish a protocol data unit (PDU) session for relaying traffic between a remote WTRU and a core network based on a default configuration, e.g., default data network name (DNN). Various signaling mechanisms and resource usages on the remote WTRU and the WTRU-to-network relay in such communication networks may be inadequate or inefficient.

SUMMARY

A wireless transmit/receive unit-to-network (WTRU-to-network) relay may be configured to send a network registration request indicating its WTRU-to-network relay capability. In response to the network registration request, an indication of one or more authorized relay service types and the communication parameter(s) associated with the authorized relay service type(s) may be received. Based on the communication parameter(s) and the network resource(s) granted to the WTRU-to-network relay, the WTRU-to-network relay may identify, from the authorized relay service type(s), a relay service type for broadcasting. For example, an authorized relay service type may be identified for broadcasting on a condition that the communication parameter(s) associated with the relay service type is supported by the granted network resource associated with the WTRU-to-network relay. The granted network resource may be or may include a PDU session parameter, such as a single network slice selection assistance information (S-NSSAI), a data network name (DNN), and/or a session and service continuity (SSC) mode. The identified relay service type may be broadcasted.

A relay access WTRU (which may be or may include a remote WTRU) may be configured to send a network registration request that may include an indication of WTRU-to-network relay access capability. In response to the network registration request, an indication of one or more authorized relay service type and communication parameters associated with the authorized relay service type may be received. A relay service type of interest may be identified from the authorized relay service type(s), for example, based on network resource requirement(s) and the communication parameters associated with the authorized relay service type(s). The relay access WTRU may be configured to receive a broadcast message that may include one or more relay service types provided by a WTRU-to-network relay. Whether to select the WTRU-to-network relay may be determined based on the relay service type(s) provided by the WTRU-to-network relay and the identified service type(s) of interest.

Relay service type(s) of interest may be identified from the authorized relay service type(s), for example, based on network resource requirement(s) and the communication parameters associated with the authorized relay service type(s). For example, an authorized relay service type may be identified as a relay service type of interest on a condition that the network resource requirement associated with the relay access WTRU is supported by communication parameters associated with the authorized relay service type. A WTRU-to-network relay may be selected on a condition that the relay service types broadcasted by the WTRU-to-network includes a relay service type of interest identified by the relay access WTRU. The communication parameters associated with an authorized relay service type may be or may include an S-NSSAI, a DNN, and/or a SSC mode. The network resource requirement associated with the relay access WTRU may be or may include an S-NSSAI, a DNN, and/or an SSC mode.

Systems and methods are described herein for enabling discovery and selection of a WTRU-to-network relay by a remote WTRU and handling a WTRU-to-network relay configuration update. A WTRU-to-network relay may perform an initial registration with a core network. The WTRU-to-network relay may receive one or more WTRU-to-network relay provisioning parameters from the core network. The WTRU-to-network relay may broadcast a service type indicating that the service type is conditionally available. When the configured service type becomes part of a list of allowed service types, the WTRU-to-network relay may update its broadcasting information about the service type being conditionally available to being available.

Systems and methods are described herein for relaying traffic between one or more remote WTRUs (e.g., the remote WTRUs having distinct service requirements) and the core network node via a WTRU-to-network relay. The WTRU-to-network relay may request PDU session parameters from the core network for each of the remote WTRUs associated with the WTRU-to-network relay. The WTRU-to-network relay may maintain a mapping between a remote WTRU and one or more PDU session parameters. The WTRU-to-network relay may establish a PDU session for traffic relay. The WTRU-to-network relay may reuse an existing PDU session for relay traffic, if session parameters associated with an existing PDU session match PDU session requirements of the remote WTRU. The WTRU-to-network relay may provide the remote WTRU with PDU session parameters associated with the PC5 connection during the PC5 connection establishment. If no existing PDU session matches with the remote WTRU's requested session parameters, the WTRU-to-network relay may send a PDU session establishment request to network with the requested PDU session parameters. The WTRU-to-network relay may receive a PDU session establishment response from the core network. The WTRU-to-network relay may then start relaying traffic between the remote WTRU and the core network.

A remote WTRU may perform discovery and selection of a WTRU-to-network relay based on relay broadcast of service type associated with control access group (CAG) IDs, for example during provisioning (e.g., implicit CAG based selection) or based on relay broadcast of CAG information including one or more of the following: current CAG cell supported CAG IDs, relay allowed CAG IDs, or CAG only indication (e.g., explicit CAG based selection).

A WTRU-to-network relay may perform access control of a remote WTRU accessing a CAG cell. A relay WTRU may determine that the remote WTRU is authorized to access the CAG ID based on a successful per application/service type authentication, e.g., wherein the application may be associated with the CAG ID, and PC5 layer keys may be established/derived using application layer keys.

A WTRU-to-network relay may perform PC5 link maintenance based on changing CAG ID (e.g., after mobility or configuration update). A relay WTRU may determine whether a connected remote WTRU is authorized to access the serving cell (e.g., new serving cell) via the relay, e.g., following a CAG change based on remote WTRU CAG information mapped with PC5 link and current serving cell CAG information. A relay WTRU may release the PC5 link providing a cause that may indicate a CAG context, for example new CAG context (e.g., no CAG ID available).

The ProSe L2 relay may subscribe paging message for the remote WTRU, e.g., if the ProSe L2 relay is in connected status.

A stop monitoring procedure (e.g., between a remote WTRU and a relay WTRU) may be performed, for example, when a remote WTRU re-enters network coverage.

A remote WTRU and a WTRU-to-network relay may establish a secure PC5 link using credentials derived from the remote WTRU's primary authentication run performed via the WTRU-to-network relay.

DETAILED DESCRIPTION

Figure 1A:
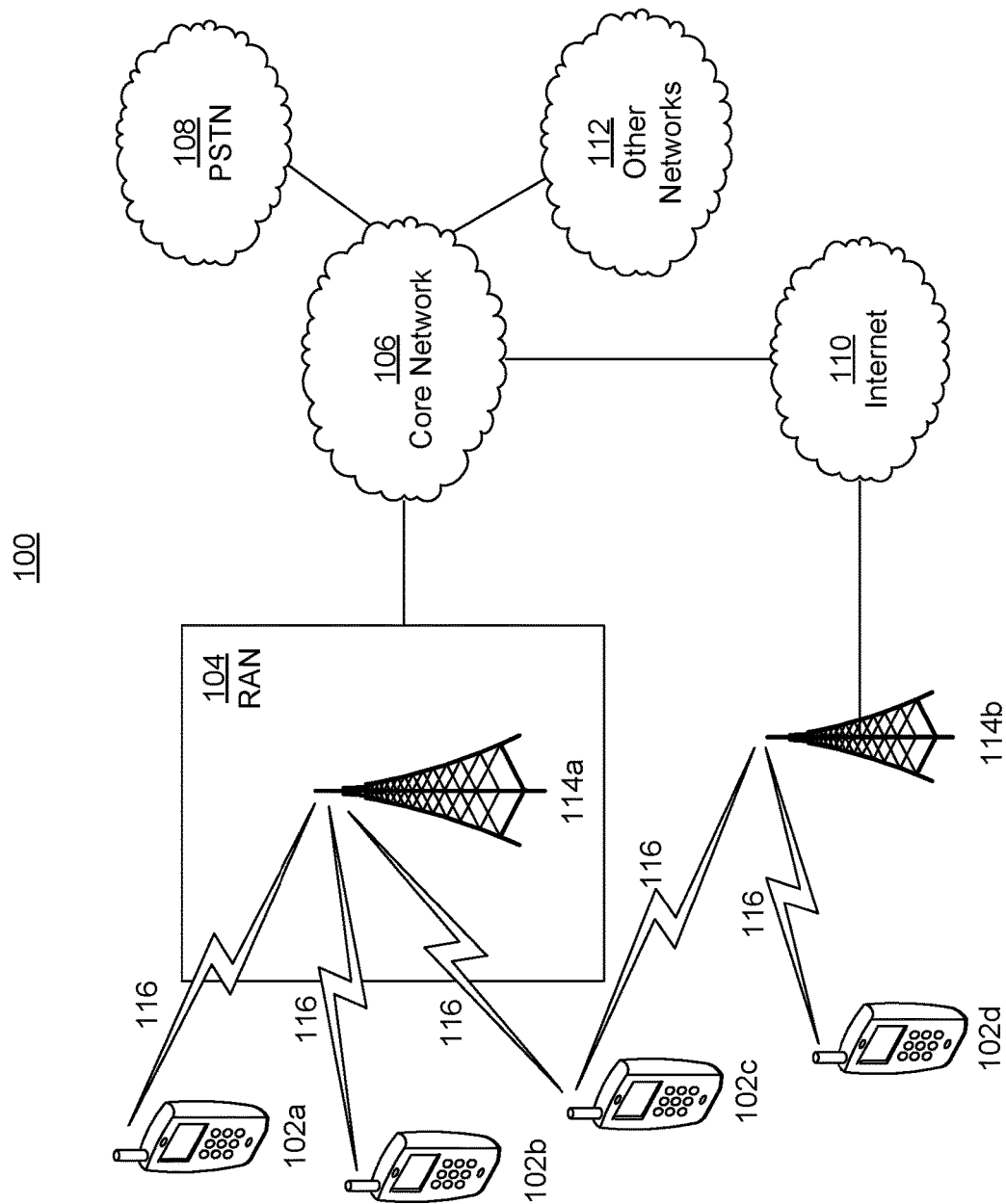
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles, Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WIMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the Internet protocol (IP) in the TCP/IP internee protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
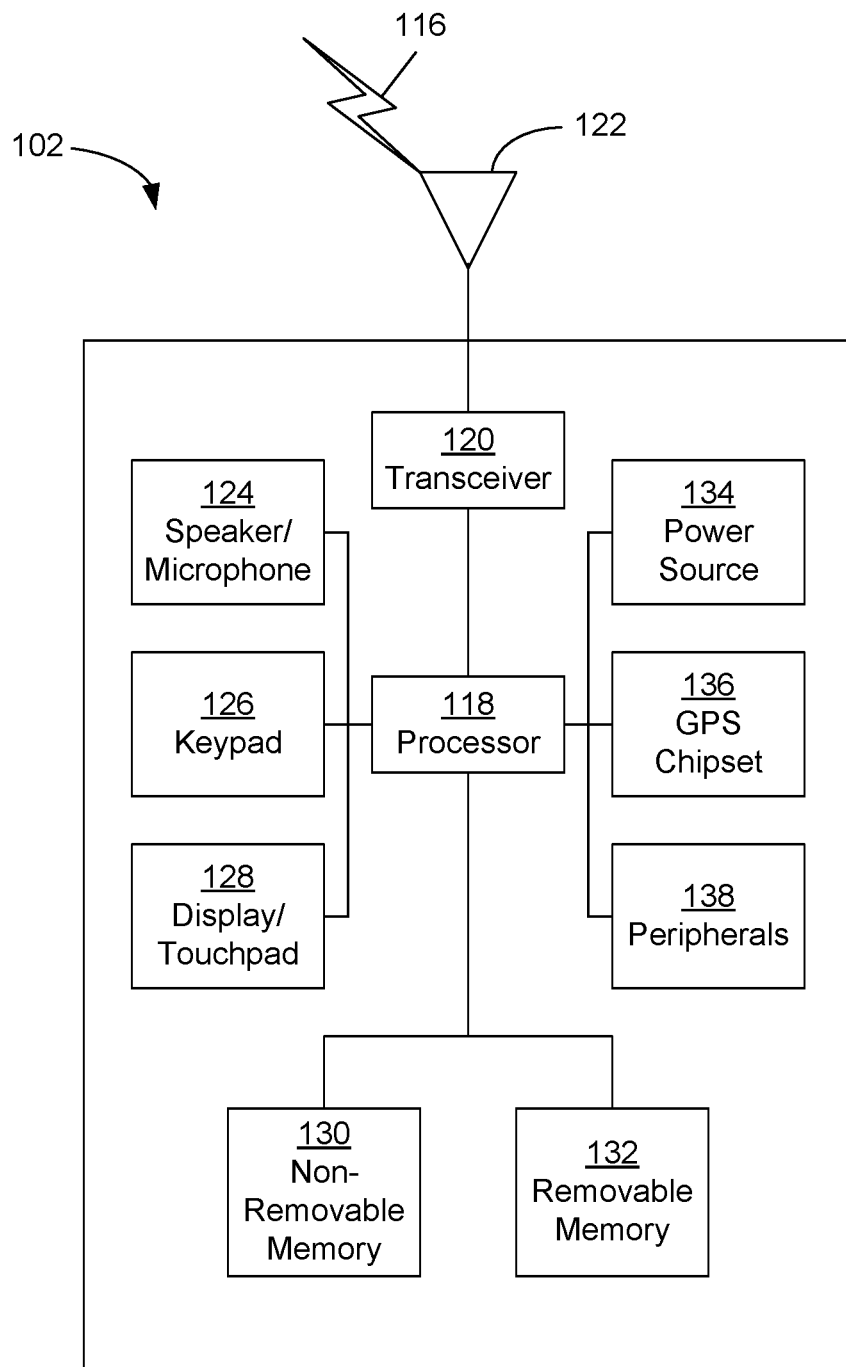
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It with be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the aft interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
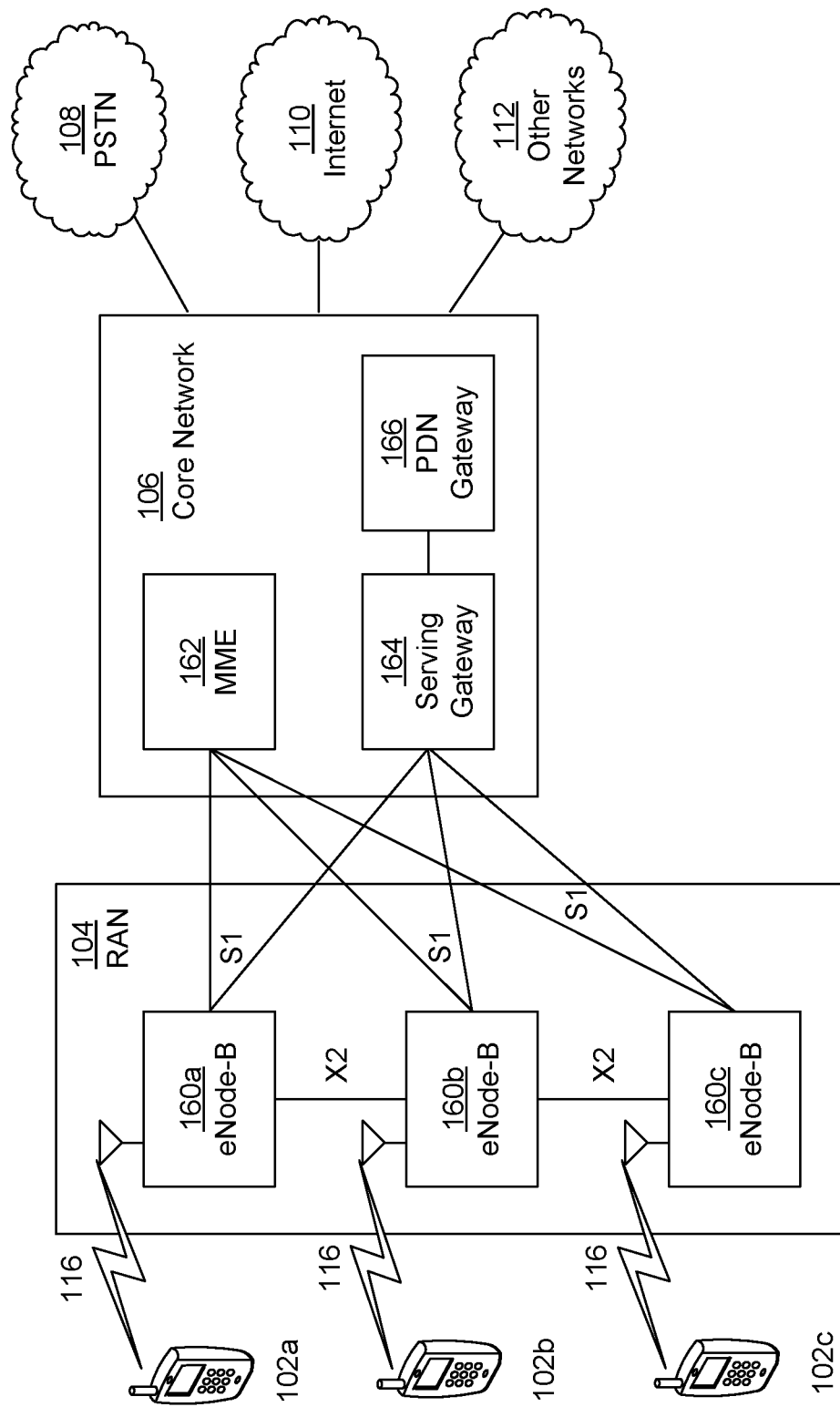
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it with be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel, if the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
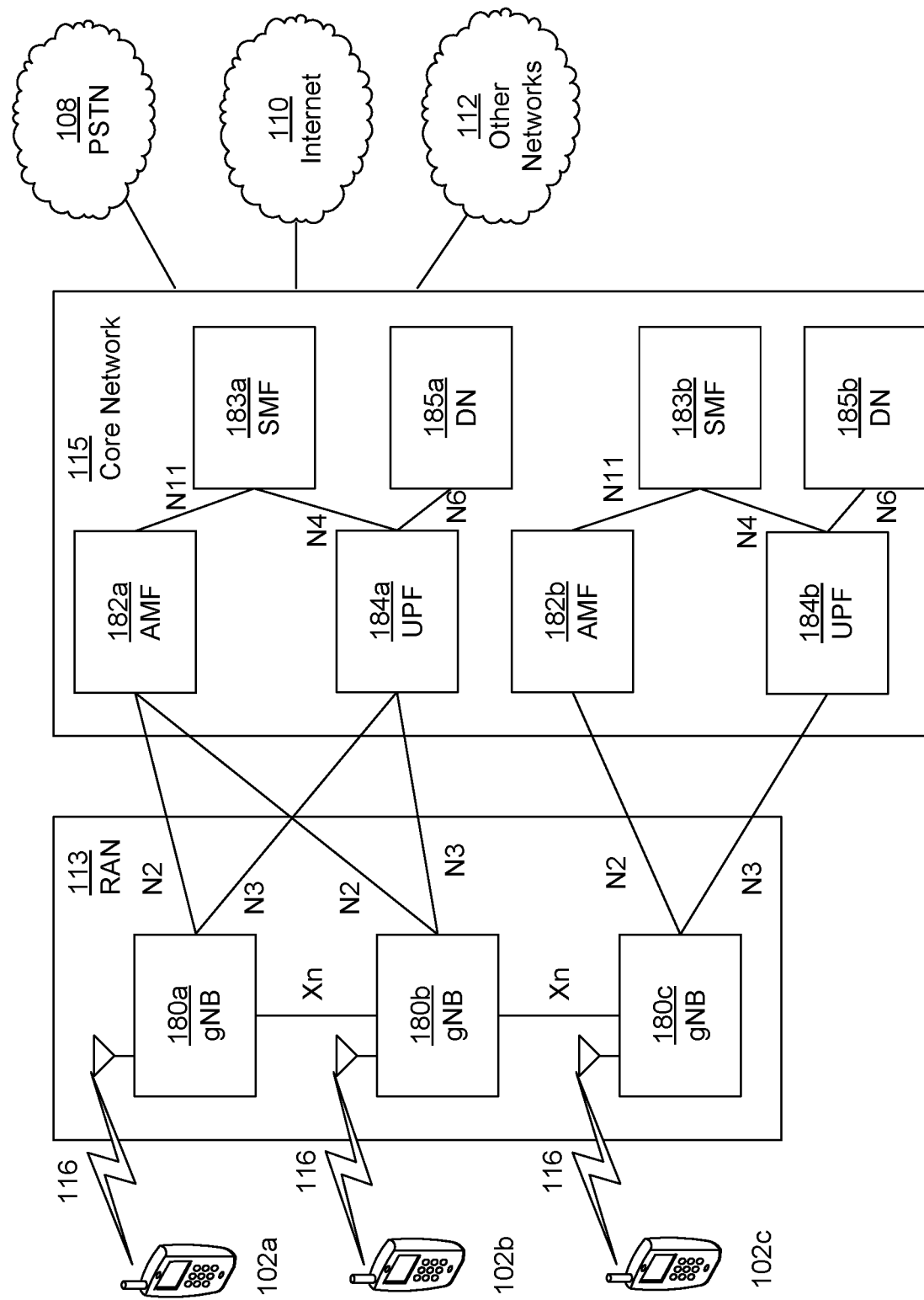
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 1020 may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b, in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGA 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
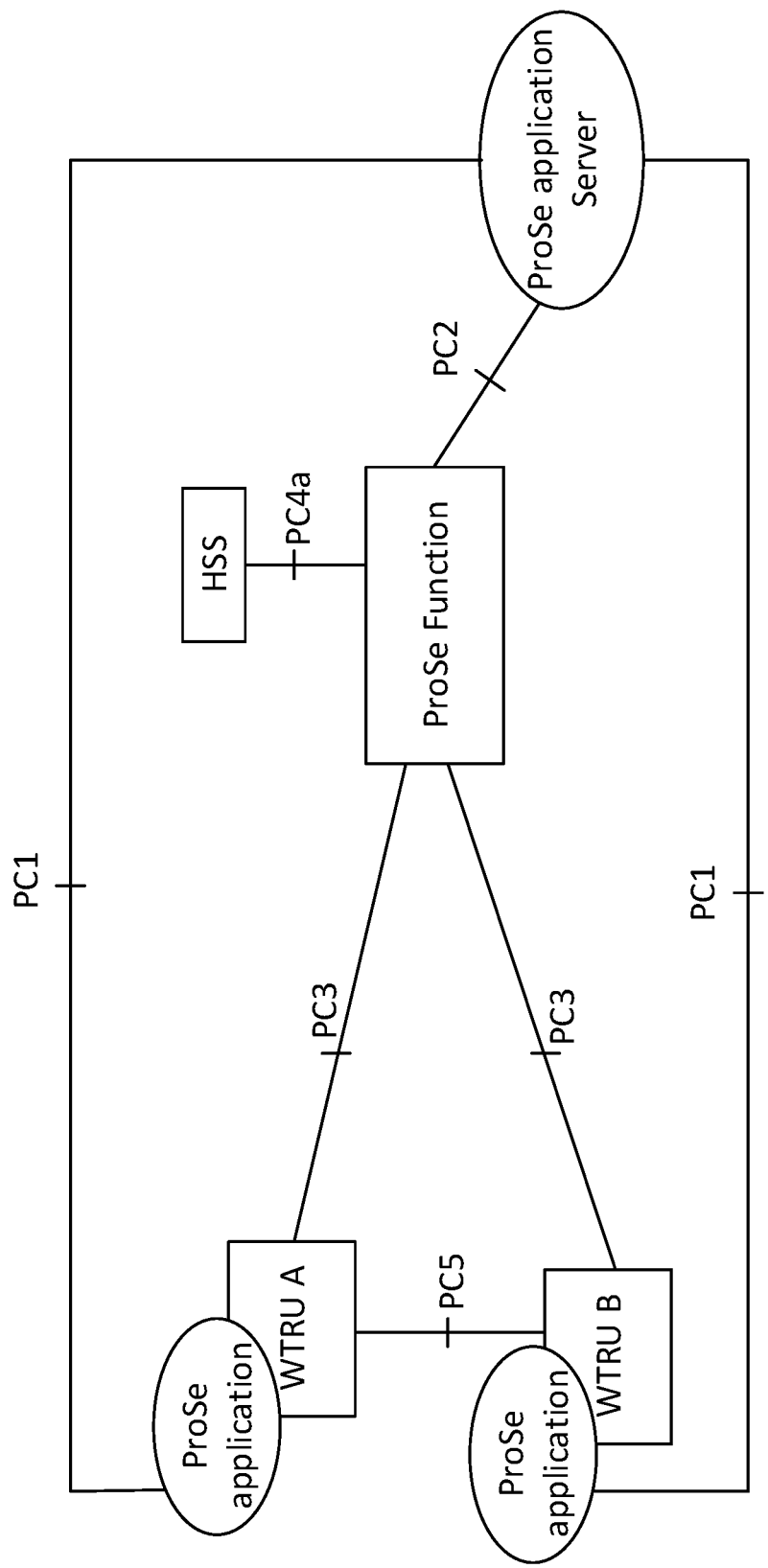
FIG. 2 is a diagram illustrating an exemplary reference model of proximity-based services.

Proximity Services (ProSe) in wireless communication systems may enable direct communication between two WTRUs that are in proximity to each other. When used herein, the term ProSe may be used to refer to direct WTRU-to-WTRU transmissions, whether using or not using network scheduler based coordination. FIG. 2 illustrates an exemplary reference model of proximity-based services. The ProSe Function, as illustrated in FIG. 2, may include one or more of a direct provisioning function (DPF) or a direct discovery name management function. The DPF may be used to provision a WTRU with one or more parameters to use ProSe direct discovery and ProSe direct communication services. The direct discovery name management function may be used for open ProSe direct discovery, for example, to allocate and process the mapping of ProSe application IDs and ProSe application codes used in ProSe direct discovery.

As illustrated in FIG. 2, ProSe-enabled WTRUs that are in proximity (e.g., WTRU A and WTRU B) may support exchange of ProSe control information between each of the WTRUs and the ProSe function over an interface (e.g., a PC3 interface). The ProSe-enabled WTRUs may also support procedures for open and restricted ProSe direct discovery of other ProSe-enabled WTRUs over a radio interface (e.g., a PC5 interface).

A ProSe application server may support one or more capabilities including, for example, storage of ProSe application layer information (e.g., mapping of application layer user IDs) and network layer ProSe user IDs.

Figure 3:
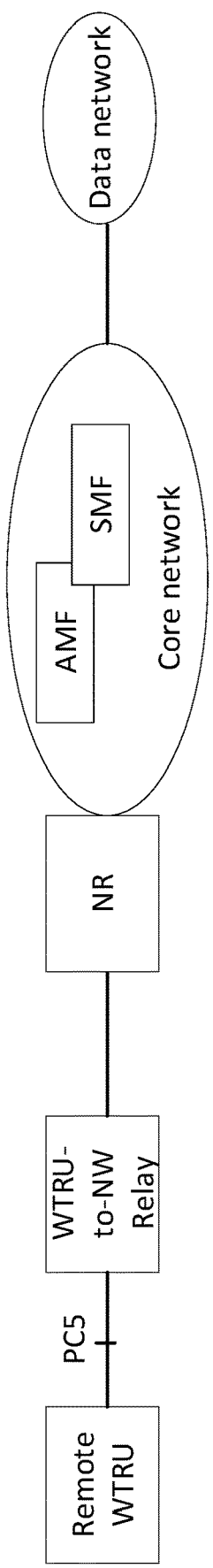
FIG. 3 is a diagram illustrating ProSe architecture using a WTRU-to-network relay.

FIG. 3 illustrates an exemplary ProSe architecture using a WTRU-to-network relay. The ProSe WTRU-to-network relay in the network may enable one or more remote WTRUs to connect with the core network. As illustrated in FIG. 3, a remote WTRU that is out of coverage of a NR network and cannot connect to the core network directly may use its PC5 interface to communicate with a WTRU-to-network relay to connect with the core network. The remote WTRU as shown in FIG. 3 may discover and select a WTRU-to-network relay. The WTRU-to-network relay may establish a PDU session (or a PDN connection in evolved packet core (EPC)) for the remote WTRU. The traffic between the remote WTRU and the core network may be relayed via the WTRU-to-network relay, for example, as illustrated in FIG. 4.

Figure 4:
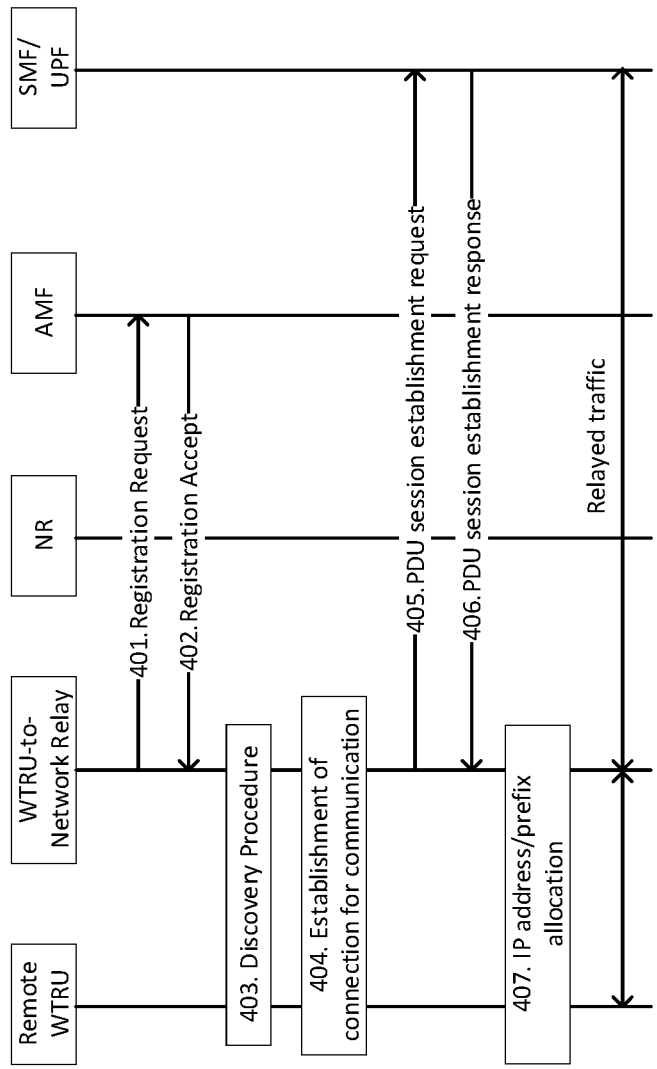
FIG. 4 is an exemplary message sequence diagram illustrating establishment of traffic between a remote WTRU and a core network node (e.g., session management function (SMF)/user plane function (UPF)).

FIG. 4 is an exemplary message sequence diagram illustrating establishment of a session between a remote WTRU and a core network node (e.g., session management function (SMF)/user plane function (UPF). As illustrated in FIG. 4, at 401, the WTRU-to-network relay may send a registration request to the access and mobility management function in the core network. At 402, the WTRU-to-network relay may receive a registration accept message. At 403, the remote WTRU may perform a discovery procedure. At 404, the remote WTRU may establish a connection with the WTRU-to-network relay. At 405, the WTRU-to-network relay may send a PDU session establishment request to the SMF/UPF of the core network. At 406, the WTRU-to-network relay may receive an establishment response from the SMF/UPF. At 407, an IP address/prefix allocated to the remote WTRU and the traffic between the remote WTRU and the core network may be relayed via the WTRU-to-network relay.

A 5G System may support Public Network integrated Non-Public Network (PNI-NPN) using control access group (CAG) cell-based selection and access control. CAG enabled WTRUs (e.g. configured with appropriate CAG IDs) may be authorized to access the network (e.g. via a CAG cell). A CAG enabled WTRU may select a CAG cell that broadcasts supported CAG IDs, e.g., that match at least one of its allowed CAG IDs (e.g. configured in the WTRU and/or included in subscription). A WTRU may be granted access to the network (e.g. by AMF) via a CAG cell (e.g. if at least one of the allowed CAG ID from the WTRU subscription is included in the CAG cell supported CAG ID). A CAG enabled WTRU configured with a "CAG only indication" may access the network (e.g. via a CAG cell). Without such an indication the WTRU may access both CAG and non-CAG cell (e.g., public cell).

Figure 5:
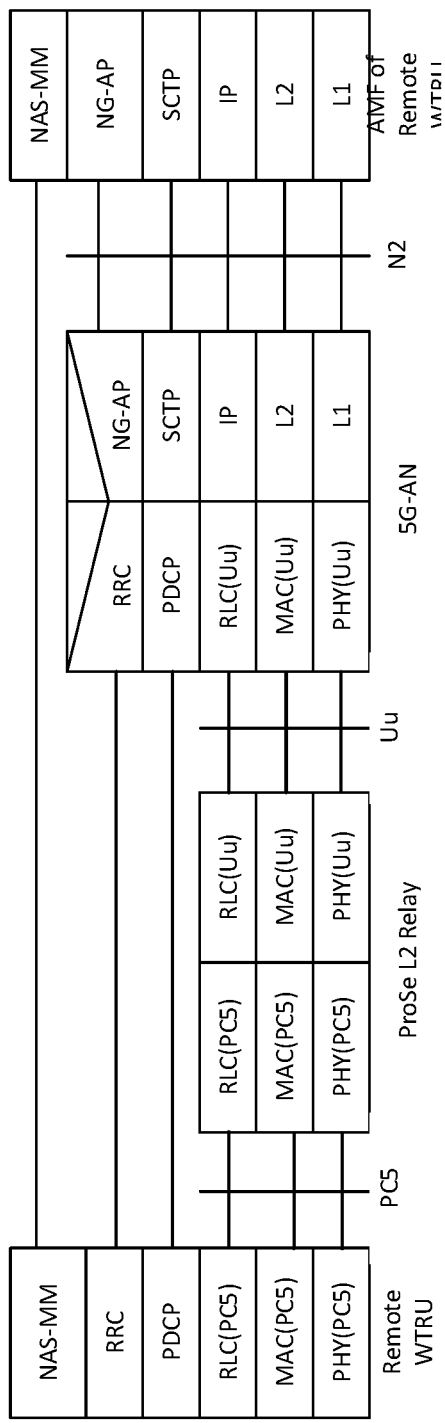
FIG. 5 illustrates an example control plane protocol stack.

A remote WTRU may access the network (e.g. via ProSe L2 relay). FIG. 5 illustrates an example control plane protocol stack. The remote WTRU may be visible to the network (e.g. with ProSe L2 relay). The RAN may terminate RRC signaling and/or NG-AP signaling (e.g. with ProSe L2 relay). The behavior of the remote WTRU may be the same as a non-remote WTRU (e.g. from the AMF's point of view). The remote WTRU may access 5G-RAN via a ProSe L2 relay, and the RRC layer behavior may be the same as a non-remote WTRU.

The 5G-RAN may release RRC connection with the remote WTRU (e.g. to move a remote WTRU into Idle state, which may be the same as a non-remote WTRU). The ProSe L2 relay may intercept the paging message (e.g. on behalf of the remote WTRU) and forward the paging message to the remote WTRU (e.g. if the remote WTRU keeps the PC5 session). The 5G-RAN may send an RRC paging message (e.g. when the ProSe L2 relay is in idle mode). The 5G-RAN may send the remote WTRU's RRC paging message to the ProSe L2 relay via the ProSe L2 relay's SRB and/or DRB (e.g. when the ProSe L2 relay is in connected mode).

The remote WTRU may be authorized to access a network via a WTRU-to-network relay by performing a primary authentication run via the relay and using the relay's AMF and the remote WTRU's authentication function (AUSF). The remote WTRU may complete the PC5 link establishment with the relay to perform communications via the relay (e.g., following a successful primary authentication and authorization).

In a wireless communication network (e.g., a 4G wireless communication network), WTRU-to-network relay may establish a PCU session for traffic relay based on default configuration, e.g., default Data Network Name (DNN). Network slicing in a 5G communication network may introduce a set of communication service requirements, which the WTRU-to-network relay may support. A 4G WTRU-to-network relay may not support one or more remote WTRUs slicing requirements, for example, because of the existing limit of Network Slice Selection Assistance Information (NSSAI) storage (e.g., up to 8 allowed NSSAI, 16 configured NSSAI) or other restrictions a serving network may impose on the use of number of simultaneous S-NSSAIs by the WTRU. A WTRU-to-network relay may therefore be limited in terms of the types of services it may provide simultaneously to remote WTRUs in terms of slicing (S-NSSAI) or other PDU session parameters (e.g., PDU session type, Session and Service Continuity (SSC) mode, etc.). For example, a WTRU-to-network relay may be provisioned with a configured NSSAI that may not include the S-NSSAI a remote WTRU may use. A remote WTRU may initiate communication (e.g., selectively initiate communication) with a WTRU-to-network relay that may support the communication service requirements instead of a WTRU-to-network relay that may not support such requirements, for example, to avoid unnecessary signaling and resources usage, on both the remote WTRU and the WTRU-to-network relay node.

Mechanisms may be provided for a remote WTRU's discovery and/or selection of a WTRU-to-network relay that may satisfy the remote WTRU's communication requirements for a single NSSAI (S-NSSAI)). Mechanisms may also be provided for a WTRU-to-network relay handling a WTRU-to-network relay configuration update (e.g., update of slicing configuration) regarding relay discovery and one or more relay communications.

WTRU-to-network relay may be discovered and selected based on slicing information and/or CAG ID. A WTRU-to-network relay (e.g., a 4G WTRU-to-network relay) may establish a PDU session for traffic relay based on a default configuration, e.g., a default DNN. One or more PDU sessions for relayed traffic from one or more remote WTRUs may share the same parameters including, for example, a DNN, an NSSAI, and an SSC mode. However, one or more remote WTRUs may have distinct requirements for their relayed traffic. For example, some remote WTRUs may demand service continuity, while other remote WTRUs may demand specific network slicing (e.g., an NSSAI) for the traffic associated with those remote WTRUs. Configured PDU session parameters used for each of the remote WTRUs may not satisfy distinct requirements associated with the remote WTRUs. This may result in service interruption and/or bad user experience. Dedicated PDU sessions for each of the remote WTRUs may be provided.

WTRU-to-network relay discovery and selection (e.g. CAG ID based) may be performed. A WTRU-to-network relay and remote WTRUs may be deployed (e.g. in an industrial and/or vertical setting). The relay may provide extended range in a building (e.g., factory) to remote WTRUs (e.g., machines, operator phone) that want to access a private network provided by a PNI-NPN. Access to PNI-NPN via a WTRU-to-network relay may be supported (e.g., in such a use case). One or more of the features described herein may relate to one or more of the following:
  discovery and selection of a WTRU-to-network relay that
    can provide access (e.g. via a CAG cell); access control
    of a remote WTRU (e.g., CAG or non-CAG enabled)
    that wants to access the network using a WTRU-to-
    network relay connected via a cell (e.g., CAG or
    non-CAG); handling the changing of available CAGs
    (e.g. CAG cell change due to WTRU-to-network relay
    mobility) with regards to relay discovery and ongoing
    relay communications through that relay; or a WTRU-
    to-network relay CAG configuration update (e.g.,
    allowed CAG ID update).

A remote WTRU may be paged (e.g. via ProSe L2 relay). The 5G-RAN may remove (e.g. when the remote WTRU enters idle state) the stored remote WTRU context information associated with a connected WTRU (e.g. identity, mobility, security, and/or the like). The 5G-RAN may not know where the remote WTRU is, e.g., whether the remote WTRU still accesses a ProSe L2 relay and/or which ProSe L2 relay the remote WTRU still accesses. The 5G-RAN may broadcast the remote WTRU's paging message on the paging channel and send a paging message to all ProSe L2 relays in Connected mode (e.g. in order to ensure the remote WTRU receives the paging message) via SRB or DRB one by one. In examples, a paging message for each remote WTRU may need to be sent to the ProSe L2 relays in Connected mode by unicast method. Sending a paging message for each remote WTRU to the ProSe L2 relays in connected mode by unicast method may cause massive radio resource consumption, e.g., because there may be massive ProSe L2 relays in the paging area of the remote WTRU (e.g. in the tracking area (TA) list).

Redundant system information blocks (SIBs) and paging information may be received during Idle Mode. A remote WTRU in idle mode may (e.g., in an L2 relay scenario) receive (e.g., from the L2 WTRU to network relay node) SIB information including, for example, a cell id and a paging message. A remote WTRU (e.g., in an L2 relay scenario) may re-enter network coverage. A remote WTRU returning to network coverage may receive the same information from two different sources (e.g., from the relay WTRU and the network (RAN)). One or more procedures may inform a relay WTRU that broadcast information is no longer required. In an example, a remote WTRU may inform a relay WTRU that the relayed information is no longer required.

The remote WTRU may establish a secure PC5 link with a WTRU-to-network relay. For example, the remote WTRU may perform a primary authentication run via the WTRU-to-network relay through the relay's AMF and the remote WTRU's AUSF when trying to establish a PC5 link with the relay. Following the successful authentication and authorization of the remote WTRU to use the WTRU-to-network relay, the remote WTRU and the WTRU-to-network relay may proceed with establishing a secure PC5 link. Security keys may be established for the PC5 link to protect the communication via the relay over the PC5 link. Additional authentication procedure between the remote WTRU and the WTRU-to-network relay may be avoided. Unnecessary signaling and waste of resources both at the remote WTRU and the WTRU-to-network relay, which may cause a denial of service (DOS) condition, may be avoided.

The terms relay WTRU, WTRU-to-network relay, WTRU-to-network relay WTRU, WTRU-to-NW relay may be used interchangeably herein. The terms remote WTRU, relay user, and relay user WTRU may be used interchangeably herein. A relay access WTRU may be or may include a remote WTRU as described herein.

A WTRU-to-network relay may be configured to provide discovery mechanisms for one or more remote WTRUs. The WTRU-to-network relay may perform a registration (e.g., an initial registration) with a core network as a WTRU that is capable of being a WTRU-to-network relay node. The WTRU-to-network relay may receive one or more WTRU-to-network relay provisioning parameters from the core network. The WTRU-to-network relay may receive the WTRU-to-network relay provisioning parameters during or after its registration with the core network. The WTRU-to-network relay provisioning parameters may include one or more of: a set of service types authorized to be relayed by the WTRU-to-network relay, and/or one or more associated communication parameters (S-NSSAI, DNN, SSC mode etc.) associated with each service type. The S-NSSAI associated with a service may be part of the WTRU configured NSSAI.

A WTRU-to-network relay may register with a core network to request an S-NSSAI based on the relay provisioning information. The S-NSSAI may not be currently allowed by the network. The WTRU-to-network relay may perform registration for one or more (e.g., all) S-NSSAIs corresponding to the provisioned service types in advance or the WTRU-to-network relay may trigger registration for an S-NSSAI corresponding to a provisioned service type, for example, on receiving a request from a remote WTRU. The WTRU-to-network relay may trigger registration for an S-NSSAI corresponding to the service type based on one or more WTRU-to-network relay provisioning parameters.

A WTRU-to-network relay may broadcast one or more messages over its PC5 interface announcing the service type(s) it may support. The broadcast message(s) may include a WTRU-to-network relay indication, for example, based on one or more WTRU-to-network relay provisioning parameters. The WTRU-to-network relay may broadcast a service type, for example, if the corresponding S-NSSAI is included in the granted network resources, such as the allowed NSSAIs. The WTRU-to-network relay may broadcast a service type, for example, if the corresponding S-NSSAI is included in the list of configured NSSAIs but not in the allowed NSSAIs. In the case of broadcasting a service type that corresponds to a configured NSSAI, the broadcast message may include an indication (either explicitly or implicitly) that the service type is conditionally available. Once the configured S-NSSAI is part of the allowed NSSAI, the WTRU-to-network relay may stop broadcasting the indication that the service type is conditionally available.

A WTRU-to-network relay may refrain from broadcasting a service type for which an associated communication parameter (e.g., the associated S-NSSAI) is rejected (e.g., for a registration area, or a Public Land Mobile Network (PLMN)), e.g., as a network resource. The WTRU-to-network relay (e.g., for overload control purposes) may not broadcast one or more service types (e.g., stop all service broadcast) when it reaches a maximum usage and/or a load threshold. The WTRU-to-network relay may include an explicit or implicit indication of high-level usage in its service broadcast, for example, when the relay WTRU attains a configured high-level usage and/or a load threshold. The high-level usage value or the load threshold value may be provisioned as part of the WTRU-to-network relay provisioning parameters. The high-level usage value or the load threshold value may be provisioned using an overload control policy parameter. The usage level or the load level of a relay WTRU may be based on the number of active PC5 links the WTRU-to-network relay may have with one or more remote WTRUs, the number and type of PDU sessions, etc.

A WTRU-to-network relay may trigger a registration procedure when it receives a request from a remote WTRU, for example, for a conditionally available service. The WTRU-to-network relay may send a registration request message to the network. The registration request message may include the S-NSSAI corresponding to the service requested by the remote WTRU. The WTRU-to-network relay may complete a new link setup with the remote WTRU by sending a confirmation message in response to the request from the remote WTRU (e.g., a Direct Communication Accept) if the S-NSSAI is successfully allowed by the network. The WTRU-to-network relay may initiate a link modification for an existing link to add or remove a service, for example, if the S-NSSAI is successfully allowed or is rejected by the network. The WTRU-to-network relay may release an established link if the S-NSSAI is rejected. The WTRU-to-network relay may provide a remote WTRU with a cause that the slice is not available.

A remote WTRU (which may be referred to as a relay access WTRU herein) may perform an initial registration with a network as a WTRU capable of using (e.g., accessing) a WTRU-to-network relay. The remote WTRU may receive during or after registration one or more relay access WTRU provisioning parameters including, for example, a set of service types authorized to use through a relay, for each service type the associated communication parameters (e.g., S-NSSAI, DNN, SSC mode etc.), and/or WTRU-to-network relay selection policy. The S-NSSAI required by the service may be assumed to be part of the WTRU configured NSSAI.

A remote WTRU may register with a core network to request S-NSSAIs that may not be currently allowed and that are associated with services from the relay provisioning information. A remote WTRU (e.g., an out of coverage WTRU) may detect a broadcast message announcing one or more relayed service type(s), that the remote WTRU may use (e.g. to satisfy a network requirement, such as an application's requirement, and/or service continuity), for example, based on the relay access WTRU provisioning parameters.

A remote WTRU may select a WTRU-to-network relay based on at least a relay selection policy. The remote WTRU may select the WTRU-to-network relay, for example, based on the services offered by the WTRU-to-network relay. The remote WTRU may select the WTRU-to-network relay in order to minimize the number of PC5 links it may need to setup with multiple WTRU-to-network relays (e.g., with overlapping service offering).

A remote WTRU may select one or more relays for similar service types for redundancy in relayed communications. The remote WTRU may select a WTRU-to-network relay that may be broadcasting a service available indication before trying a different relay that may be broadcasting the same service as conditionally available.

A remote WTRU may select a WTRU-to-network relay with no high usage indication in the service broadcast over a relay broadcasting such indication or refrain from connecting to a relay broadcasting such indication.

A WTRU-to-network relay may receive a slicing configuration update. For example, the WTRU-to-network relay may receive a WTRU configuration update (UCU) message. The UCU message may include slicing information (e.g., new slicing information). The slicing information may be one or more of the configured NSSAI, an allowed NSSAI, a rejected S-NSSAIs, etc. The WTRU-to-network relay may suspend its broadcasts announcing the service type(s) it may support, for example, prior to the completion of the UCU procedure. The WTRU may complete the UCU procedure by updating its slicing configuration based on the contents of the UCU message.

The WTRU-to-network relay may resume broadcasts announcing the service type(s) it supports for one or more allowed S-NSSAIs that are not affected by the UCU procedure. The WTRU-to-network relay may continue services on any of the existing PC5 links established with one or more remote WTRUs that may be using such services.

The WTRU-to-network relay may register with the network to request S-NSSAI from the updated configured NSSAIs that are not currently allowed and required by service types according to the relay provisioning information. The WTRU-to-network relay may broadcast over PC5 interface one or more broadcast messages announcing the service type(s) it may support with the associated S-NSSAIs that are now allowed.

The WTRU-to-network relay may perform a link modification procedure on the PC5 link(s) with one or more remote WTRUs for service type(s), if the associated S-NSSAI in the relay provisioning information was rejected by the network (e.g., the WTRU-to-network may relay receive from the network rejected S-NSSAIs including the associated S-NSSAI). The WTRU-to-network relay may provide a cause to the remote WTRU that the slice is not available. If no service is allowed or conditioned on a PC5 link, the WTRU-to-network relay may release the link with the relay access WTRU.

A WTRU-to-network relay may create a dedicated PDU session for a remote WTRU. PDU session parameters (e.g., the route selection policy) may include one or more of following parameters: S-NSSAI, DNN, PDU Session Type, SSC mode, etc. In an example, the WTRU-to-network relay may request PDU session parameters from the core network for each of the remote WTRUs associated with the WTRU-to-network relay. The WTRU-to-network relay may maintain a mapping between a remote WTRU and one or more PDU session parameters. A WTRU-to-network relay may retrieve the PDU session parameters for a remote WTRU, for example, when the remote WTRU establishes connection for communication with WTRU-to-network relay. The WTRU-to-network relay may establish a PDU session for traffic relay. The WTRU-to-network relay may re-use an existing PDU session for relay traffic instead of establishing a new one, if an existing PDU session fulfills the PDU session requirements of the remote WTRU. For example, a first remote WTRU may be associated with PDU session parameters for a S-NSSAI and a second remote WTRU may have the same PDU session parameters. The traffic of both the WTRUs may be associated with the same PDU session. The WTRU-to-network relay may modify the PDU session based on the QoS requirements received from the remote WTRU, for example, if the WTRU-to-network relay uses the same PDU session for both the WTRUs.

A WTRU-to-network relay may request PDU session parameters for remote WTRUs during initial registration with the core network or when the remote WTRU establishes a PC5 connection with WTRU-to-network relay. The WTRU-to-network relay may request one or more PDU session parameters for each of the possible remote WTRUs, or for dedicated remote WTRU(s) by including remote WTRU ID(s) and ProSe service type/id in the request message. Different dedicated PDU sessions may be established by the WTRU-to-network relay for the same remote WTRU that may use different application/service types with different PDU Session requirements (e.g., S-NSSAI, DNN).

The WTRU-to-network relay may send a PDU session parameters request to the core network. The PDU session parameters request may include remote WTRU ID(s). The WTRU-to-network relay may receive and/or store PDU session parameters for one or more remote WTRU ID(s). The WTRU-to-network relay may retrieve PDU session parameters for the remote WTRU, for example, when a PC5 connection is established with the remote WTRU. The WTRU-to-network relay may verify whether an existing PDU session may be re-used for the remote WTRU. The WTRU-to-network relay may determine whether an existing PDU session may satisfy the requirements of the remote WTRU's PDU session parameters.

If an existing PDU session satisfying the requirements of the remote WTRU's PDU session parameters is not found, the WTRU-to-network relay may send PDU session establishment request to network with the PDU session parameters for the remote WTRU. The WTRU-to-network relay may include the remote WTRU ID in the PDU session establishment request. The remote WTRU ID may be utilized by the AMF to perform SMF selection. If an existing PDU session is found, the WTRU-to-network relay may associate the remote WTRU with the existing PDU session.

Figure 6:
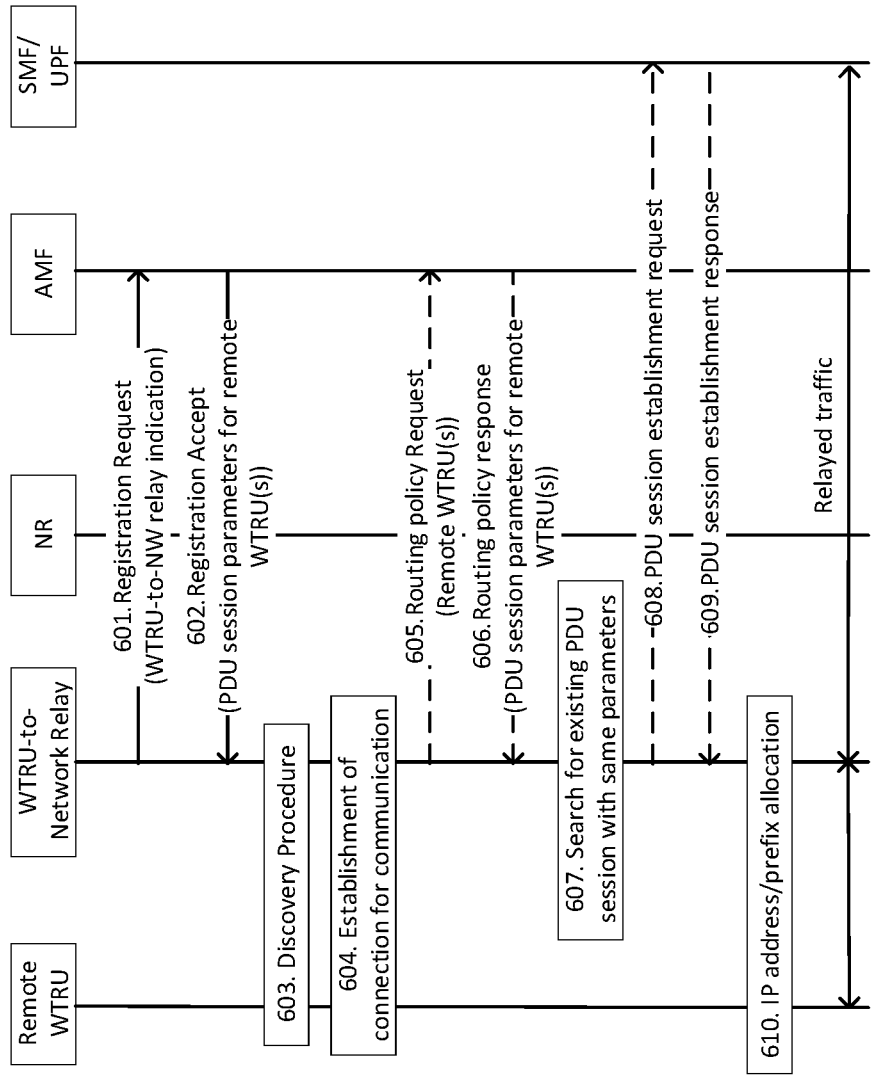
FIG. 6 is an exemplary message sequence diagram illustrating establishment of traffic between a remote WTRU and a core network node (e.g., SMF/UPF).

FIG. 6 illustrates an example of a PDU session establishment between a remote WTRU and a core network via a ProSe WTRU-to-network relay. As illustrated in FIG. 6, at 601, the WTRU-to-network relay sends a registration request message to a core network node (e.g., comprising an AMF). The registration request message may include a WTRU-to-network relay indication. At 602, the WTRU-to-network relay may receive a registration accept message from the core network (e.g., from an AMF in the core network). The registration accept message may include one or more PDU session parameters for one or more remote WTRUs that are associated with the WTRU-to-network relay. The WTRU-to-network relay may store the mapping information between remote WTRUs and PDU session parameters, e.g., mapping between a remote WTRU ID to an NSSAI associated with a PDU session.

At 603, the remote WTRU may execute its discovery procedure to discover a WTRU-to-network relay. At 604, the remote WTRU and the discovered WTRU-to-network relay may establish a PC5 connection. If no PDU session parameters associated with the remote WTRU are known to the WTRU-to-network relay (e.g., if the WTRU-to-network relay did not request PDU session parameters during its registration with the core network), at 605, the WTRU-to-network relay may send a routing policy request message to the core network (e.g., to the AMF of the core network). The routing policy request message may include one or more ID associated with one or more of remote WTRUs. The request may include a ProSe service type/service id.

At 606, the WTRU-to-network relay may receive a routing policy response message from the core network (e.g., from the AMF of the core network). The routing policy response message received by the WTRU-to-network relay may include one or more PDU session parameters for the remote WTRUs.

At 607, the WTRU-to-network relay may search for an existing PDU session that may be re-used for a remote WTRU, for example, based on the remote WTRU's PDU session parameters and the parameters associated with the existing PDU session. If a match between the PDU session parameters associated with an existing PDU session and the remote WTRUs requirements is found, the WTRU-to-network relay may associate the existing PDU session with the remote WTRU and no new PDU session may be created.

At 608, the WTRU-to-network relay may send a PDU session establishment request message, for example, if no existing PDU session is found for this remote WTRU. The PDU session establishment request message may include PDU session parameters associated with the remote WTRU. At 609, the WTRU-to-network relay may receive a PDU session establishment response message from the core network (e.g., from the SMF of the core network).

At 610, the remote WTRU may obtain an IP address/prefix and the WTRU-to-network relay may start relaying traffic between the remote WTRU and the core network.

The remote WTRU may provide one or more PDU session parameters to a WTRU-to-network relay, for example, when the remote WTRU establishes connection for communication with WTRU-to-network relay. The WTRU-to-network relay may establish a PDU session for the remote WTRU based on the received PDU session parameters. The remote WTRU may provide one or more PDU session parameters to the WTRU-to-network relay via a Direct communication request message, or other following message, e.g. a dedicated message for Parameters provisioning, an IP address/prefix request message, etc.

A WTRU-to-network relay may receive and/or store PDU session parameters associated with one or more remote WTRU IDs when (or after) a PC5 connection is established between the WTRU-to-network relay and the remote WTRU. The WTRU-to-network relay may verify whether an existing PDU session may be re-used for the requesting remote WTRU. For example, the WTRU-to-network relay may determine whether an existing PDU session matches the requested PDU session parameters received from the remote WTRU. If an existing PDU session that may be re-used is not found, the WTRU-to-network relay may send a PDU session establishment request to network. The PDU session establishment request may include the PDU session parameters (e.g., the new PDU session parameters) received from the remote WTRU. If an existing PDU session that may be re-used is found, the WTRU-to-network relay may associate the remote WTRU with the matching PDU session.

Figure 7:
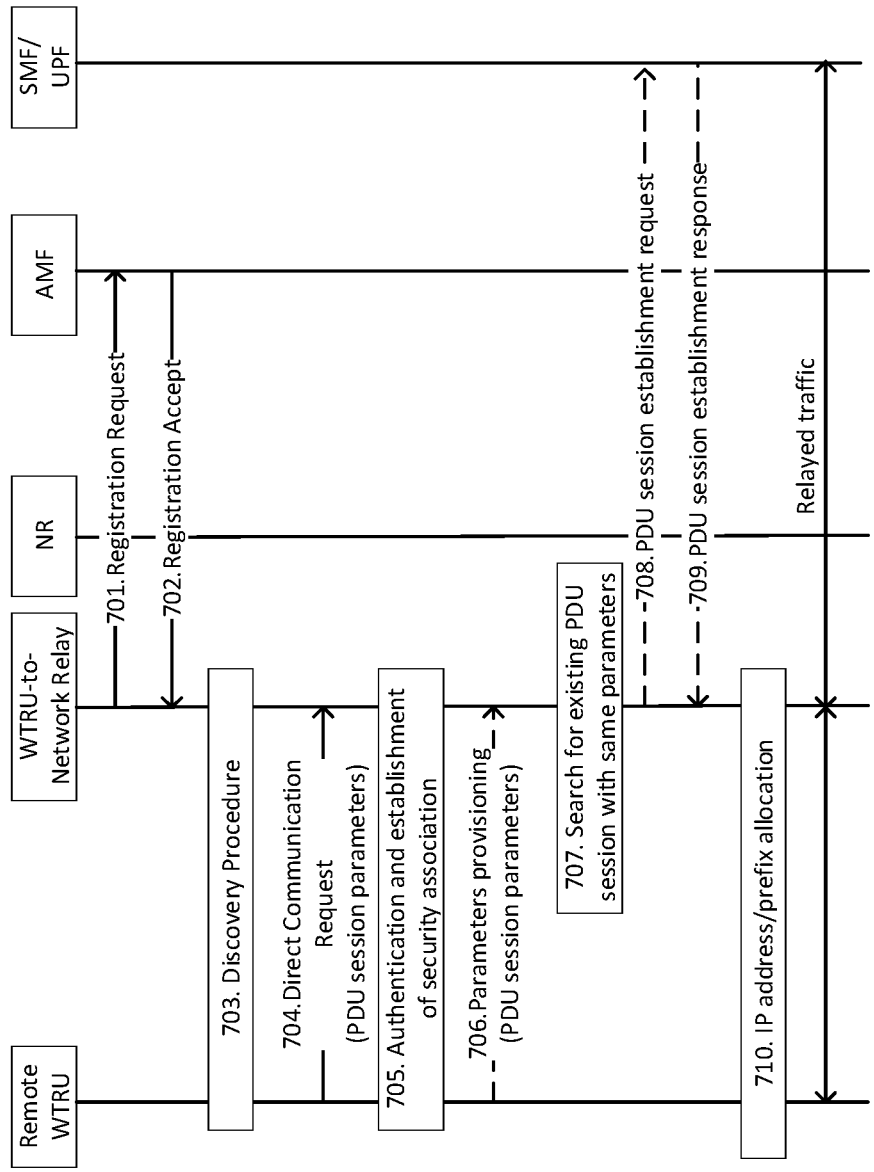
FIG. 7 is an exemplary message sequence diagram illustrating establishment of traffic between a remote WTRU and a core network node (e.g., SMF/UPF).

A remote WTRU may send one or more PDU session parameters to a WTRU-to-network relay when (or after) requesting a PC5 connection establishment. FIG. 7 illustrates an example of a remote WTRU establishing a PDU session with a core network node via a WTRU-to-network relay. As illustrated in FIG. 7, at 701, a WTRU-to-network relay may send a registration request message to the core network (e.g., the AMF of the core network). At 702, the WTRU-to-network relay may receive a registration accept message from the AMF in the core network. At 703, the remote WTRU may discover a WTRU-to-network relay. At 704, the remote WTRU may send a direct communication request message to the WTRU-to-network relay. The direct communication request message may include one or more PDU session parameters. The remote WTRU may postpone the transmission of one or more of the PDU session parameters that may be privacy sensitive (e.g., S-NISSAI) to a later step, for example, when a security association between the remote WTRU and the WTRU-to-network relay has been established. For example, in FIG. 7, the remote WTRU may transmit one or more PDU session parameters after 705 or 706. For example, in FIG. 7, after 705 (mutual authentication) the WTRU-to-network relay may request the one or more PDU session parameters by including an indication in a Direct Security Mode (DSM) Command message sent to the remote WTRU. The WTRU may reply with a DSM Complete message with confidentiality and integrity protection that includes the PDU session parameters. At 705, a mutual authentication between the remote WTRU and the WTRU-to-network relay may be performed. At 705, a security association between the remote WTRU and the WTRU-to-network relay may be established. At 705, the WTRU-to-network relay may send a Direct Communication Accept (DCA) message to complete the PC5 unicast link establishment with the remote WTRU. At 706, the remote WTRU may provide one or more PDU session parameters to the WTRU-to-network relay, for example, using a parameters provisioning message (or an IP address/prefix request message). The parameters provisioning message may correspond to a protected DSM complete message as described above.

At 707, the WTRU-to-network relay may search for an existing PDU session that may be re-used for the remote WTRU. The WTRU-to-network relay may perform the search based on the remote WTRU's requested PDU session parameters and the parameters associated with an existing PDU session. If the WTRU-to-network relay determines that an existing PDU session matches the remote WTRU's requested PDU session parameters, the WTRU-to-network relay may associate the PDU session with the remote WTRU and no new PDU session may be created.

At 708, if the WTRU-to-network relay determines that none of the existing PDU sessions satisfies the remote WTRU's requested PDU session parameters, the WTRU-to-network relay may send a PDU session establishment request to the core network. The PDU session establishment may include the PDU session parameters received from the remote WTRU. The WTRU-to-network relay may include the remote WTRU ID associated with the requesting WTRU in the PDU session establishment request. The core network, e.g., AMF, may use the remote WTRU ID to perform SMF selection.

At 709, the WTRU-to-network relay may receive a PDU session establishment response from the core network (e.g., the SMF). At 710, the remote WTRU may obtain an IP address/prefix and the WTRU-to-network relay may start relaying traffic between the remote WTRU and the core network.

A WTRU-to-network relay may include a remote WTRU ID and/or information about a ProSe Service requested by the remote WTRU in the PDU session request message. The core network (e.g., the AMF and/or the SMF of the core network) may determine the PDU session parameters that may be accepted. For example, the PDU session parameters may be accepted based on the remote WTRU's ID and/or the ProSe Service requested by the remote WTRU. The core network may send a PDU session response message to the WTRU-to-network relay. The PDU session response message may include the accepted PDU session parameters, e.g. accepted S-NSSAI, DDN, etc.

The WTRU-to-network relay behavior receive a remote WTRU ID and/or the ProSe Service requested by the remote WTRU during discovery or authorization and provisioning, or PC5 connection establishment. The WTRU-to-network relay may send a PDU session request to core network, which may include remote WTRU ID(s) and/or the ProSe Service requested by the remote WTRU. The WTRU-to-network relay may receive a PDU session response message from the core network, which may include the accepted PDU session parameters, e.g. S-NSSAI, DDN.

The AMF/SMF, in core network, may receive a remote WTRU ID and/or the ProSe Service from a WTRU-to-network relay. The AMF/SMF may receive the remote WTRU ID and/or the ProSe Service in a PDU session establishment request message. The AMF/SMF may retrieve one or more PDU session parameters associated with the remote WTRU or the ProSe service, e.g., by querying the policy control function (PCF). The AMF/SMF may send a PDU session establishment response to the WTRU-to-network relay. The PDU session establishment response may include one or more accepted PDU session parameters.

The WTRU-to-network relay may provide the PDU session parameters of an established PDU session to the remote WTRU, for example, after WTRU-to-network relay establishes the PDU session for the remote WTRU, e.g. based on configuration, WTRU route selection policy (URSP) rule, and/or received PDU session parameters from the remote WTRU. The remote WTRU may store the association between the PDU session parameters and the PC5 connection. For every newly detected application, the remote WTRU may evaluate whether the PDU session parameters associated with existing PC5 connections can satisfy the application's requirements. Based on the evaluation, the remote WTRU may reuse an existing PC5 connection or establish a new one. The remote WTRU may retrieve the application's requirements, e.g. PDU session type, SSC mode, DNN, based on local URSP rule.

For example, the WTRU-to-network relay may establish a PDU session for PC5 connections when and/or after PC5 connection is established with the remote WTRU. The WTRU-to-network relay may provide the PDU session parameters that are associated to the PC5 connection, e.g. a PDU session type, an SSC mode, to the remote WTRU.

For example, the remote WTRU may receive the PDU session parameters which may be associated to a PC5 connection. The remote WTRU may store the association between PDU session parameters and PC5 connection. The remote WTRU may retrieve new launched application's requirements, e.g. a PDU session type, an SSC mode, an S-NSSAI and/or a DNN, based on remote WTRU's local URSP. The remote WTRU may determine whether an existing PC5 connection can be used for the new launched application. The remote WTRU may reuse an existing PC5 connection or establishes a new PC5 connection for the new launched application.

WTRU-to-network relay discovery and selection may be performed (e.g. CAG ID based). A remote WTRU may perform discovery and selection of a WTRU-to-network relay based on: a relay broadcasted service type associated with one or more CAG IDs (e.g. allowed CAG IDs) provided during provisioning; and/or, broadcasted CAG information from the relay and/or the CAG cell that the relay is connected to.

In examples, a remote WTRU may need to be a CAG enabled WTRU, with a configured Allowed CAG ID list and/or a CAG only indication. A WTRU may perform an initial registration with the network as a relay user capable WTRU. A WTRU may receive (e.g. during or after registration) relay access WTRU provisioning parameters such as a set of service types authorized for use through a relay with optional associated CAG IDs (e.g. CAG IDs may be part of the WTRU Allowed CAG IDs), and/or WTRU-to-network relay selection policy. Required CAG IDs may be communicated by the application layer (e.g., an industrial application may require a particular private network to connect to). Parameters may be pre-configured in the relay access WTRU (e.g., to enable the WTRU to perform relay discovery and/or selection of a relay WTRU prior to the first initial Registration).

A relay access WTRU may detect a broadcast message over PC5 from the relay. The broadcast message may include a WTRU-to-network relay capability indication, one or more service type(s) supported by the relay, the WTRU-to-network relay allowed CAG IDs, the supported CAG IDs (e.g. from the cell the relay is currently connected to or camping on), the WTRU-to-network relay CAG only indication (e.g. specifying whether the relay is allowed to access the network via CAG cells), and/or a CAG/non-CAG cell indication for the cell the relay is currently connected to (e.g. indicating whether it is a CAG or non-CAG cell).

A relay access WTRU may select a WTRU-to-network relay according to the relay selection policy. A relay access WTRU may select the WTRU-to-network relay that broadcasts one or more service type(s) associated with one of the relay access WTRU's allowed CAG ID (e.g. implicit CAG ID based selection). A relay access WTRU may select the WTRU-to-network relay with the most compatible CAG configuration, (e.g. one or more common CAG IDs between the relay access WTRU and the WTRU-to-network relay's allowed CAG IDs, and/or a same CAG indication (e.g. a same CAG only indication) configuration as the WTRU-to-network relay's).

In examples, for a non-CAG remote WTRU, a remote WTRU may not select a relay unless the relay is not connected/camped on a CAG cell (e.g., based on CAG/non-CAG cell indication).

The remote WTRU may select the relay using one or more of the following features (e.g. if the broadcast message from the relay WTRU doesn't contain CAG specific information). The remote WTRU may select the relay WTRU based on broadcast information (e.g., service type(s), generic relay service code, and/or relay capability indication). The remote WTRU may proceed with establishment of a PC5 link with the relay WTRU. The remote WTRU may receive a PC5 unicast security protected message (e.g., DSMC) from the relay WTRU including one or more of the following: the allowed CAG IDs, CAG only indication, current cell supported CAG IDs, and/or CAG cell/Non-CAG cell indication. The remote WTRU may select the relay using a selection policy as in examples herein. The remote WTRU may send to the relay WTRU a PC5 unicast security protected message including its CAG IDs configuration and/or a subset of selected CAG IDs matching the available CAG IDs from the relay WTRU (e.g. if the remoted WTRU determines that relay WTRU supported CAG IDs are suitable). The remote WTRU may proceed with a PC5 link establishment or maintain a current PC5 link with the relay WTRU (e.g. if a PC5 link is already established). The remote WTRU may abort the PC5 link establishment and/or tear down an established PC5 link (e.g. if the relay WTRU does not provide suitable/compatible CAG IDs for the remote WTRU).

A WTRU-to-network relay may enable its discovery by remote WTRU accessing the network via a CAG Cell. In examples, the WTRU-to-network relay may be a CAG enabled WTRU, with a configured allowed CAG ID list and a CAG indication (e.g. a CAG only indication). A relay access WTRU may select a CAG Cell, (e.g. which is part of its allowed CAG ID list) and register with the network via that CAG Cell. A WTRU may perform an initial registration with the network. To function as a WTRU-to-network relay, a relay access WTRU may receive (e.g. during or after registration) provisioning parameters, such as: a set of service types authorized for use through a relay, where the provisioning parameters may have associated CAG IDs (e.g. CAG IDs may be part of the WTRU Allowed CAG IDs); and/or, a relay operating policy. The relay WTRU may broadcast over the PC5 interface one or more messages announcing the service type(s) and/or CAG Information. The relay WTRU may decide to broadcast the service types that are associated with one or more CAG IDs that are available in the CAG cell that the relay WTRU is connected to (e.g. broadcast supported CAG IDs by the CAG Cell).

A WTRU-to-network relay may perform access control of a remote WTRU accessing the network via a CAG Cell based on provisioned service types associated with one or more CAG IDs (e.g. allowed CAG IDs). In examples, the WTRU-to-network relay may be discovered and selected by the remote WTRU (e.g. based on service type/CAG ID information). A WTRU may perform mutual authentication with the remote WTRU. PC5 layer keys (e.g., KD) may be established/derived using application layer keys. A WTRU may determine that a remote WTRU is authorized to access the CAG ID(s) associated with the application/service type (e.g. based on successful per application/service type authentication). A WTRU may complete PC5 link establishment, and, may proceed with PDU session establishment/modification.

The WTRU-to-network relay may be a Layer 2 (L2) relay. One or more of the following may apply. The relay WTRU may establish a PC5 link with the remote WTRU and forward NAS messages (e.g. encapsulated in RRC message) from the remote WTRU to the network. The remote WTRU's serving AMF may perform conventional CAG based access control. The relay WTRU may detect a rejection message (e.g., Registration Reject) from the AMF to the remote WTRU (e.g. when the remote WTRU is not allowed to access the current (CAG) cell serving the relay WTRU). The relay may tear down the PC5 link with the remote WTRU on a condition of detecting a rejection message.

The available CAG may change (e.g. due to WTRU-to-network relay's mobility). CAG-A and CAG-B may be available (e.g. when the WTRU-to-network relay camps on the Cell-A). The remote WTRU which has CAG-A included in its Allowed CAG ID (e.g. but not CAG-B) may a establish PC5 session (e.g. to access to CAG-A via the WTRU-to-network relay). The remote WTRU may not be allowed to access the network anymore through the WTRU-to-network relay/Cell-B (e.g. when the WTRU-to-network relay moves to Cell-B which may be limited to supporting CAG-B).

A WTRU-to-network CAG configuration (e.g. Allowed CAG ID and/or CAG indication) may be updated by the network, for example, at any time (e.g., via UGU). A configuration update (e.g. a WTRU-to-network CAG configuration update) may trigger the WTRU-to-network to re-select a new cell. Remote WTRUs connectivity via the WTRU-to-network may be impacted. Remote WTRUs may need to re-select and reconnect to the WTRU-to-network relay following such a CAG configuration update or select a different WTRU-to-network relay (e.g. if the first WTRU-to-network relay does not satisfy the CAG based access requirements of the remote WTRU).

A remote WTRU CAG configuration (e.g. Allowed CAG ID and/or CAG indication, for example a CAG only indication) may be updated by the network, for example, at any time (e.g., via UCU). Remote WTRU CAG configuration updating may trigger the remote WTRU to release a PC5 link with a currently used relay WTRU and search for another more suitable relay WTRU (e.g., that supports remote WTRU new Allowed CAG IDs).

The relay WTRU may notify the remote WTRU about the CAG change (e.g. send updated available CAG information via PC5 broadcast and/or unicast message). The relay WTRU may tear down the PC5 link with the remote WTRU (e.g. while releasing the link the relay may provide the remote WTRU with a cause code indicating that the CAG context has changed). The cause code may indicate that available CAG IDs have been changed and/or the cell type that the relay WTRU is connected to or camping on has changed (e.g. from CAG cell to non-CAG cell or vice versa), no CAG IDs are available, and/or current CAG access (e.g. via relay) is not authorized. The relay WTRU may need to tear down PC5 links (e.g. all PC5 links) with remote WTRUs if it needs to perform a new cell selection or if no suitable cell is found.

The relay WTRU may notify the remote WTRU about the CAG change and tear down the PC5 link with the remote WTRU (e.g. if the relay WTRU determines that the remote WTRU is impacted and/or the remote WTRU doesn't support the new CAG ID). The relay WTRU may maintain a mapping of the sought CAG IDs from the remote WTRU with the PC5 link (e.g., exchanged during the PC5 link establishment). The relay WTRU may maintain the PC5 link (e.g. if the remote WTRU sought CAG IDs, Allowed or selected CAG ID's associated with the PC5 link are still available via the relay following a CAG change). The relay may tear down the PC5 link (e.g. if the remote WTRU sought CAG IDs, Allowed or selected CAG ID, associated with the PC5 link are not still available via the relay following a CAG change). The relay WTRU may acquire the WTRU's CAG indication (e.g. CAG only indication) and tear down the PC5 link (e.g. if it has moved to a non-CAG cell).

The relay access WTRU may receive (e.g. from the relay WTRU), over PC5 broadcast or unicast, updated CAG information. The relay access WTRU may tear down the PC5 link (e.g. if the WTRU determines that it is not allowed to access the network via the relay and/or the new serving cell).

The relay access WTRU may receive a link release message indicating cause code specifying that the CAG IDs have changed. The relay access WTRU may repeat the relay selection and re-select the same relay (e.g. if the WTRU is still allowed to select new CAG IDs), or the relay access WTRU may select another more suitable/compatible relay.

Figure 8:
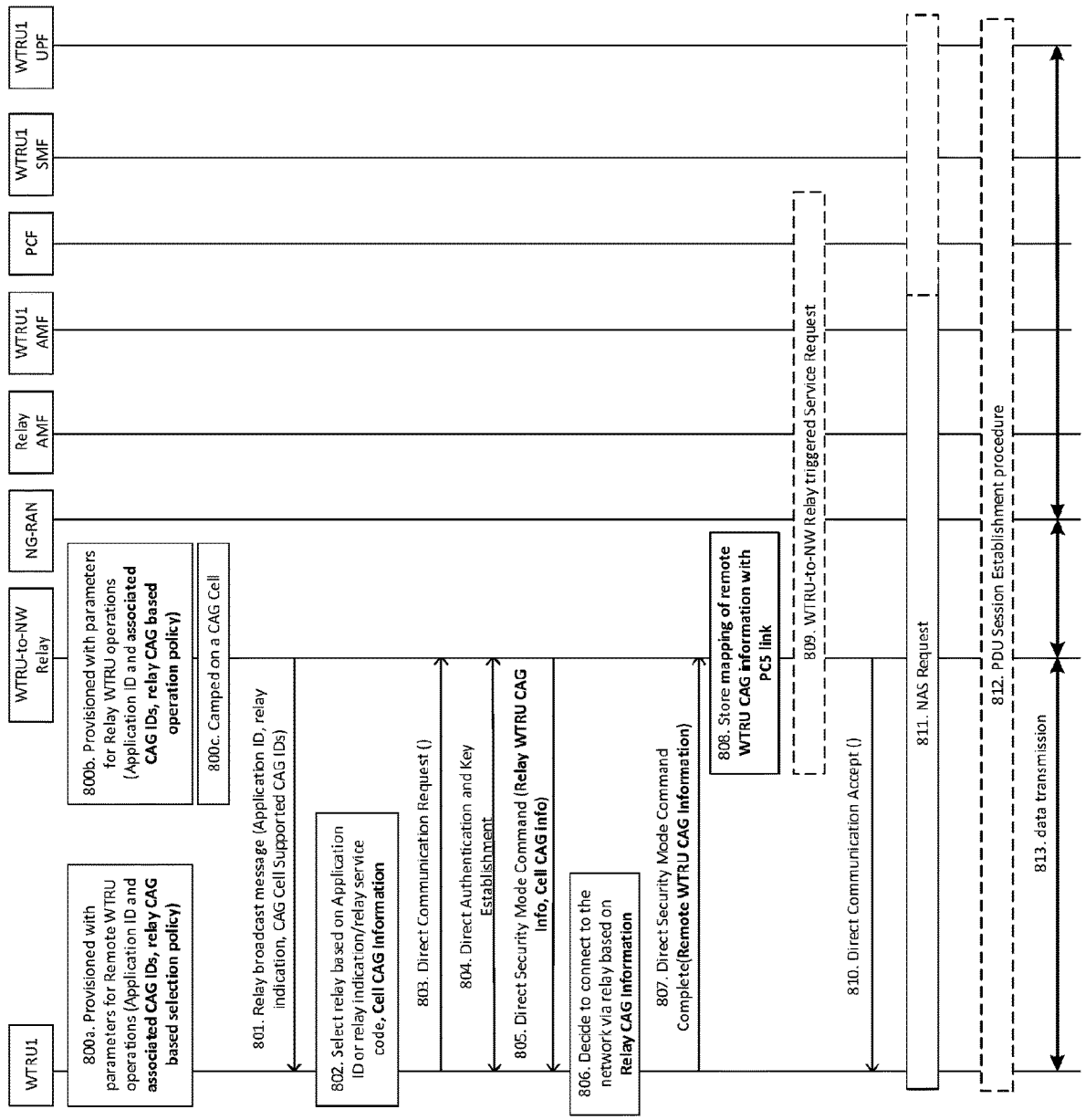
FIG. 8 illustrates a procedure for WTRU-to-network relay discovery, selection, and communication via a Layer 2 WTRU-to-network relay.

FIG. 8 illustrates a WTRU-to-network relay discovery, selection, and communication via a Layer 2 WTRU-to-network relay. As illustrated in FIG. 8 at 800, a remote WTRU (WTRU1) may be provisioned (e.g., pre-configured and/or following initial registration with the network) with parameters necessary to be able to discover/select and connect via a WTRU-to-network relay. The WTRU-to-network relay may be provisioned to provide L2 relay service. WTRU-to-network relay WTRU may be camped on a CAG Cell.

At 801, WTRU-to-network relay WTRU may send a PC5 broadcast message (e.g. including relay service related information such as application ID, relay service code, relay capability indication current cell CAG information, cell supported CAG IDs, and/or relay CAG information such as allowed CAG ID, CAG only indication).

At 802, the remote WTRU may receive the PC5 broadcast message from the WTRU-to-network relay WTRU and select the relay based on application ID, relay service code or relay capability indication, Current cell CAG information, and/or relay CAG information. At 803, the remote WTRU may send a PC5 unicast request message (e.g. to request a link establishment with WTRU-to-network relay WTRU). At 804, the remote WTRU and WTRU-to-network relay WTRU may perform a mutual authentication. At 805, the WTRU-to-network relay WTRU may send a DSMC message (e.g. including relay WTRU CAG information and Cell CAG info with integrity protection).

At 806, the remote WTRU rosy check integrity protection of DSMC and/or compare Relay/Cell CAG information with previous relay/cell CAG information received over broadcast message. The remote WTRU may abort the link establishment (e.g. if integrity check fails). the remote WTRU may check that the received relay CAG information contains at least one CAG ID matching the remote WTRU's allowed CAG IDs. The remote WTRU may proceed with link establishment (e.g. if a match is found). The remote WTRU may abort the link establishment (e.g. if a match is not found).

At 807, the remote WTRU may send to the WTRU-to-network relay WTRU a DSMC Complete message (e.g. including the remote WTRU's CAG information, such as allowed CAG IDs and/or CAG indication, with integrity and confidentiality protection). At 808, WTRU-to-network relay WTRU may store a mapping of the remote WTRU's CAG Information with the PC5 link. At 809, WTRU-to-network relay WTRU may trigger a service request procedure (e.g. if it is in CM_IDLE state). At 810, WTRU-to-network relay WTRU may send a PC5 unicast response message, e.g., to complete the PC5 link establishment.

At 811, the remote WTRU may send a NAS message to the network via the WTRU-to-network relay WTRU as described herein. WTRU-to-network relay WTRU and the remote WTRU may be served by the same or different AMFs. At 812, the remote WTRU may perform a PDU Session establishment. At 813, the remote WTRU may transmit/receive data via WTRU-to-network relay/RAN/remote WTRU UPF (e.g. where WTRU-to-network relay may perform a conventional forwarding at L2).

The ProSe L2 relay rosy subscribe to paging notification from the 5G-RAN (e.g. when the ProSe L2 relay is in CM-Connected status). The ProSe L2 relay may send a paging subscription request to 5G-RAN, in which the ProSe L2 relay ID, the remote WTRU's ID (e.g. or the remote WTRU's paging occasions (POs)) may be included. After receiving the remote WTRU's paging message from core network, the 5G-RAN may send the remote WTRU's paging message to the ProSe L2 relay (e.g. based on the remote WTRU's ID and/or POs subscribed by the ProSe L2 relay).

The ProSe L2 relay may establish PC5 connection with the remote WTRU and receive the remote WTRU's paging parameters from the remote WTRU. The remote WTRU may send paging parameters during or after the PC5 connection establishment. The remote WTRU may send updated paging parameters to ProSe L2 relay (e.g. once the paging parameters change, such as in cases of changed remote WTRU paging identity and/or POs).

The ProSe L2 relay may send (e.g. if the ProSe L2 relay is in CM connected status) a paging subscription request to 5G-RAN (e.g. which includes the ProSe L2 relay ID, the remote WTRU's ID, and/or the remote WTRU's POs). The remote WTRU's ID or POs may be retrieved from the paging parameters.

The ProSe L2 relay may suspend the paging subscription request (e.g. if the ProSe L2 relay is in Idle status). The ProSe L2 relay may send (e.g. when the ProSe L2 relay enters CM Connected status) a paging subscription request (e.g. for remote WTRUs to be subscribed, such as remote WTRUs which have a PC5 connection to the relay WTRU). The ProSe L2 relay may send a request to the 5G-RAN to unsubscribe the paging notification (e.g. if the PC5 connection with the remote WTRU is released). The ProSe L2 relay may receive a paging message for remote WTRU from 5G-RAN and forward the paging message to the remote WTRU (e.g. via PC5 interface).

The 5G-RAN may receive a paging subscription request from the ProSe L2 relay, (e.g. which includes the ProSe L2 relay ID, the remote WTRU's ID, and/or the remote WTRU's POs). The 5G-RAN may receive a paging message from the AMF. The 5G-RAN may forward the paging message to the related ProSe L2 relay (e.g. if the WTRU's ID in the paging message matches the remote WTRU's ID received in paging subscription request). The 5G-RAN may receive a paging message from the AMF. The 5G-RAN may forward the paging message to the related ProSe L2 relay (e.g. if the POs for the paging message match the POs received in paging subscription request).

A stop monitoring procedure may be performed such that transmission and/or reception of redundant information may be reduced or avoided. A remote WTRU may, for example, when the remote WTRU (re)-enters coverage of the RAN (e.g., gNB) in idle mode, check the cell ID, gNB ID and/or tracking area ID (TAI) broadcasted by the RAN. The remote WTRU may (e.g., also) check other information broadcasted in the SIB (e.g., by a relay node). The remote WTRU may compare the information received from the RAN with the broadcast information received from the relay node. For example, the remote WTRU may compare the TAI received from the RAN with the TAI received from the relay node. The remote WTRU may know (or become aware) that it can receive the paging message and other information from the RAN, for example, if both TAIs are the same or the TAI received from the RAN belongs to the TAI list, which may be received from the core network during previous registration procedure. The remote WTRU (e.g., if can receive the paging message and other information from the RAN) may decide to inform the relay node (e.g., relay WTRU) that the relayed information is no longer necessary.

A remote WTRU may initiate a stop monitoring procedure. In an example, a PC5-S stop monitoring request or a similar PC5 message may be sent to the relay WTRU. A stop monitoring request message may include, for example, an indication that the relay WTRU should stop transmitting broadcast information (e.g., SIB, cell id, paging message, Multimedia Broadcast/Multicast Service (MBMS) info/content). A stop monitoring request message may be configured to include the information that the relay WTRU should cease transmitting. For example, a remote WTRU may indicate to a relay WTRU to stop transmitting (e.g., only) the remote WTRU paging message. Other information excluded from a stop monitoring request message (e.g. SIB and cell id) may (e.g., impliedly) indicate that the other information may still be needed and may continue to) be relayed by the relay WTRU. A stop monitoring request message may be integrity protected, replay protected, and/or confidentiality protected, for example, to prevent malicious requests sent towards a relay WTRU, such as a request with the intent of causing a loss of service for the remote WTRU (e.g., a denial of service (DoS) attack).

A relay WTRU may stop relaying information (e.g., expressly and/or impliedly) indicated in a message, for example, when the relay WTRU receives the message. The relay WTRU may (e.g., also) stop reading the Uu paging channel with the remote WTRU's ID and the remote WTRU's paging occasion (PO), for example, if the paging message information is included by the remote WTRU in the stop monitoring request. The relay WTRU may send a response or acknowledgement message back to the remote WTRU (e.g., to acknowledge receipt of the request).

A remote WTRU may (e.g., at any time) initiate a normal 'information monitoring request' procedure with the relay WTRU, for example, if the remote WTRU decides to rely on broadcast information (e.g., paging message, SIB, cell id, MBMS, etc.) from the relay WTRU. The remote WTRU may, for example, send an information monitoring request message to the relay WTRU. The relay WTRU may start (e.g., resume) monitoring the requested information, may start reading the Uu paging channel and/or may reply to the remote WTRU (e.g., with an information monitoring response message).

A secure link may be established between a remote WTRU and a WTRU-to-network relay (which may be referred herein as "the relay"). For example, the security of the PC5 link between the remote WTRU and the WTRU-to-network relay may be established (e.g., bootstrap) by leveraging the primary authentication run of the remote WTRU with the network. For example, the remote WTRU may send a request message (e.g., Direct Communication Request) to the relay to establish a PC5 link. The message may include a remote WTRU identity (e.g., Subscription Concealed Identifier (SUCI)). The remote WTRU may perform a primary authentication procedure with the relay's AMF and the remote WTRU's home AUSF over the PC5 link with the relay. The remote WTRU may derive and store a PC5 root key and ID (e.g., Krelay and Krelay ID) based on a master key (e.g., KAMF) derived from the primary authentication run (e.g., following successful authentication of the network by the remote WTRU). The remote WTRU may receive over PC5 a request message (e.g., Direct Security Mode Command) from the relay. The remote WTRU may check that the request message includes a Krelay ID that matches the Krelay ID previously derived from the primary authentication. The remote WTRU may proceed with security establishment procedure by deriving session key (e.g., Krelay-sess) from Krelay and encryption and integrity key from the session key and sending a protected PC5 response message (e.g., Direct Security Mode Complete). The remote WTRU may receive a response message (e.g., Direct Communication Accept) indicating successful establishment of the PC5 link.

For example, the WTRU-to-network relay may receive a request message (e.g., DCR) from a remote WTRU to establish a PC5 link. The request message from the remote WTRU may include a remote WTRU identity (e.g., SUCI). The relay may send a request message to its serving AMF for authorization of the remote WTRU. The request message from the relay may include the remote WTRU identity (e.g., SUCI). The relay may forward back and forth authentication messages between the remote WTRU and relay's serving AMF. The relay may receive from its serving AMF a response message including a PC5 root key and ID (e.g., Krelay and Krelay ID) indicating successful authentication and authorization of the remote WTRU. The response message may include a core network remote WTRU identity (e.g., Globally Unique Temporary Identifier (GUTI), Generic Pubic Subscription Identifier (GPSI)). The relay may store the root key, key id and core network remote WTRU identity (e.g., associating them with the PC5 ink context). The relay may use Krelay received from AMF to derive session key and encryption and integrity keys. The relay may send to the remote WTRU a PC5 request message (e.g., Direct Security Mode Command) including the Krelay ID received from relay's serving AMF. Message is protected for integrity using the above integrity key. The relay may receive from the remote WTRU a PC5 response message (e.g., Direct Security Mode Complete). The relay may check the security protection of the message (e.g., confidentiality and/or integrity). Upon successfully establishing a secure PC5 ink, the relay may proceed with connectivity signaling with the network (e.g., by establishing a new or reusing of an existing PDU Session) as described herein. The relay may send a response message (e.g., DCA) to the remote WTRU indicating successful establishment of the PC5 link.

For example, the WTRU-to-network relay's serving AMF may receive a request message from the relay to authorize the remote WTRU. The message may include a remote WTRU identity (e.g., SUCI). The AMF may trigger the remote WTRU authentication procedure with the remote WTRU's home AUSF. AMF may perform remote WTRU's primary authentication procedure via the relay. The AMF may receive from the remote WTRU's AUSF a response message indicating successful authentication and authorization of the remote WTRU including a remote WTRU's identity (e.g., Subscriber Permanent Identity (SUPI)) and anchor key (e.g., KAUSF/KSEAF). The AMF may derive a PC5 root key and ID (e.g., Krelay and Krelay ID) based on a master key (e.g., KAMF) derived from the anchor key. The AMF may store the received remote WTRU identity (e.g., SUPI) as part of the relay's WTRU context. The AMF may assign and store a core network remote WTRU identity (e.g., GUTI, GPSI) as a part of the relay's WTRU context. The AMF may register with the remote WTRU's UDM as the relay's AMF serving the remote WTRU by providing the AMF identity and/or relay's identity (e.g. SUPI or GPSI). The AMF may send to the relay a response message including the PC5 root key and ID (e.g., Krelay and Krelay ID), The AMF response message may include a core network the remote WTRU identity (e.g., GPSI).

For example, a re-authentication/authorization of the remote WTRU to use the WTRU-to-network relay may be performed at the AMF serving the relay, the relay and the remote WTRU. For example, after a successful authorization of the remote WTRU to use the relay, the serving AMF may initiate a re-authentication/authorization of the remote WTRU at any time. In an example scenario, authorization scope may be limited in time or location. During the relay's mobility, a change of AMF serving the relay may occur and the new AMF may obtain from the old AMF the relay's WTRU context that includes the remote WTRU information (e.g., new Krelay and Krelay ID and identities) as described herein. The new AMF may update serving AMF registration information with the remote WTRU's UDM. The new AMF may initiate a re-authentication/authorization of the remote WTRU in the process as described herein. When such re-authentication/authorization is performed the remote WTRU may generate a new PC5 root key/key id and the relay may obtain the new Krelay and Krelay ID from the new serving AMF as described herein. The relay may perform a re-key procedure over the PC5 link with the remote WTRU using the new PC5 root key/key id. The remote WTRU may initiate a re-key procedure by including the new Krelay ID in a direct re-key request message to the relay. The relay may check that the received Krelay ID matches the new Krelay ID derived following the remote WTRU re-authentication procedure. Upon a successful matching check, the relay may trigger a Direct Security Command procedure to establish a new session, and integrity and confidentiality keys using Krelay as the PC5 link root key. The roles of the relay and the remote WTRU may be reversed in performing the above re-key procedure. For example, the relay may initiate the re-key procedure.

For example, an authorization revocation for the remote WTRU to use the WTRU-to-network relay may be performed at the AMF serving the relay, the relay and the remote WTRU. For example, the AMF may receive a request message from the remote WTRU's UDM including an indication of revocation of authorization for the remote WTRU to use the relay (e.g., due to remote WTRU subscription change) and identity of the relay serving the remote WTRU. The AMF may send a request message to the relay serving the remote WTRU including an indication of revocation of authorization for the remote WTRU to use the relay, a Krelay id associated with remote WTRU and/or core network remote WTRU identity (e.g., GPSI). The relay may locate the PC5 link context based on the received Krelay id and/core network remote WTRU identity and initiate a link release procedure of the associated PC5 link with the remote WTRU. The relay may delete the PC5 link context with associated Krelay and remote WTRU information. The relay may initiate a WTRU triggered PDU Session release procedure (e.g., when a dedicated PDU Session is being used for the remote WTRU). The relay may send a response message to the AMF indicating the successful release of remote WTRU connectivity. The AMF may send a response message to remote WTRU's UDM indicating successful authorization revocation. The AMF may send a request to revoke remote WTRU authorization as above but based on a serving network policy (e.g., for overload control purposes).

A secure link may be established between the remote WTRU and the WTRU-to-network relay following a re-connection between them. For example, the WTRU-to-network relay may receive a request message (e.g., DCR) from the remote WTRU to establish a PC5 link. The request message may include a Krelay ID. The relay may check that the received Krelay ID matches a valid existing Krelay ID that may have been established during a previous connection as described herein. The relay may use Krelay to proceed with establishing a secure PC5 link as described herein. Upon successfully establishing a secure PC5 link, the relay may proceed with connectivity signaling with the network and completion of PC5 link establishment as described herein.

Figure 9:
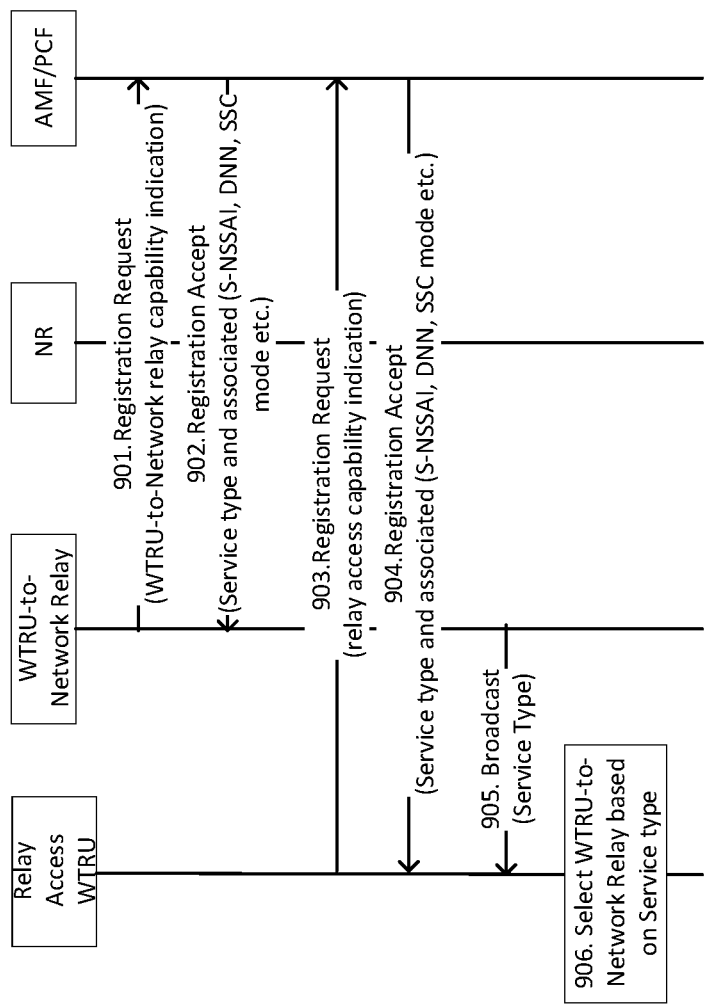
FIG. 9 is an exemplary message sequence diagram illustrating WTRU-to-network relay discovery and selection by a relay access WTRU.

FIG. 9 shows example message sequences for WTRU-to-network relay discovery and selection. A WTRU-to-network relay may be or may include a WTRU 102 as described herein with respect to FIGS. 1A-D. As illustrated in FIG. 9 at 901, the relay may send a network registration request (e.g., in a registration request message) to the core network (e.g., the AMF of the core network). The network registration request may include an indication that the relay is capable of being a WTRU-to-network relay. The AMF may receive the network registration request, and perform an Access and Mobility (AM) Policy Association Establishment with the PCF on the core network. The AMF/PCF may determine authorized relay provisioning parameters for the WTRU-to-network relay and may send, in response to network registration request, the authorized relay provisioning parameters. At 902, in response, the relay may receive one or more relay service types as part of the relay provisioning parameters authorized by the core network (e.g., the AMF/PCF of the core network) and associated communication parameters (e.g., in a registration accept message). The associated communication parameters may include PDU session parameters, such as an S-NSSAI, a DNN, and/or an SSC mode.

At 903, a relay access WTRU (e.g., a remote WTRU) may send a network registration request (e.g., in a registration request message) to the core network (e.g., the AMF of the core network). A relay access WTRU may be or may include a WTRU 102 as described herein with respect to FIGS. 1A-D. The network registration request may include an indication that the relay access WTRU is capable of relay access (e.g., accessing a relay WTRU). The AMF may perform an Access and Mobility (AM) Policy Association Establishment with the PCF on the core network. The AMF/PCF may determine authorized relay access WTRU provisioning parameters for the relay access WTRU and may send, in response to network registration request, authorized relay access WTRU provisioning parameters.

At 904, in response, the relay access WTRU may receive one or more relay service types as part of the relay access WTRU provisioning parameters authorized by the core network (e.g., the AMF/PCF of the core network) and associated communication parameters (e.g., in a registration accept message). The associated communication parameters may include PCU session parameters, such as an S-NSSAI, a DNN, and/or an SSC mode.

At 905, the WTRU-to-network relay may broadcast a relay service type (e.g., that is identified from the one or more authorized relay service types received at 902). The WTRU-to-network relay may identify the relay service type for broadcasting, e.g., based on the communication parameters associated with the one or more authorized relay service types and a granted network resource associated with the WTRU-to-network relay. For example, the relay service type may be identified for broadcasting on a condition that at least one communication parameter associated with the relay service type is supported by the granted network resource. For example, the granted network associated with the WTRU-to-network relay may be or may include an allowed network slice selection assistance information (NSSAI). The allowed NSSAI may be received from the core network (e.g., the AMF of the core network), e.g., in a registration accept message. The relay service type may be identified for broadcasting on a condition that the allowed NSSAI received from the core network includes an S-NSSAI associated with the relay service type.

The WTRU-to-network relay may receive one or more rejected network resources, such as a rejected S-NSSAI (e.g., in a registration accept message). The WTRU-to-network relay may refrain from broadcasting an authorized relay service type on a condition that the authorized relay service type is associated with a communication parameter (e.g., an S-NSSAI) that is included in the one or more rejected network resources (e.g., rejected S-NSSAIs).

At 906, the relay access WTRU may determine whether to select the WTRU-to-network relay (e.g., based on whether a relay service type that the relay access WTRU is interested in using is a relay service type that the WTRU-to-network relay broadcasts) For example, the relay access WTRU may determine to select the WTRU-to-network relay on a condition that a relay service type broadcasted by the WTRU-to-network relay matches a relay service type the relay access WTRU is interested in using.

The relay access WTRU may identify a relay service type of interest based on a network requirement and communication parameters associated with an authorized relay service type that the relay access WTRU is authorized to use. For example, an authorized relay service type may be identified as a relay service type of interest on a condition that the associated communication parameters meet a network requirement. A network requirement may be a requirement of an application, e.g., an S-NSSAI based on the relay access WTRU's local URSP. A network requirement may be a requirement for service continuity, e.g., a specific SSC mode. An authorized relay service type received from the core network may be identified as relay service type of interest, if an S-NSSAI associated with the authorized relay service type matches an S-NSSAI required by an application.

The relay access WTRU may determine to select the WTRU-to-network relay further based on a WTRU-to-network relay selection policy received from the core network (e.g., in a registration accept message). A relay selection policy may favor a WTRU-to-network relay providing the greatest number of relay service types in order to minimize the number of PC5 links that needs to be set up. A relay selection policy may favor having redundancy in relayed communications for similar relay service types. A relay selection policy may favor a WTRU-to-network relay that broadcasts an indication of a relay service type being available over another WTRU-to-network relay that broadcasts an indication of the same relay service type being conditionally available. A relay selection policy may favor a WTRU-to-network relay that broadcasts no indication of high-level usage. A relay selection policy may refrain from selecting a WTRU-to-network relay that broadcasts an indication of high-level usage.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method, implemented by a first wireless transmit/receive unit (WTRU), comprising:
   authenticating, via a second WTRU, the first WTRU with a network;
   determining a PC5 root key based on a master key obtained from the authenticating of the first WTRU;
   receiving, from the second WTRU, a first PC5 message protected based on the PC5 root key, wherein the first PC5 message is a direct security mode command message;
   determining one or more third keys, including an encryption key and/or an integrity key, based on the PC5 root key; and
   sending, to the second WTRU, a second PC5 message, wherein the second PC5 message is a direct security mode complete message is protected using at least one of the one or more third keys.

2. The method of claim 1, wherein any of: (1) the master key is derived from the authenticating of the first WTRU, (2) the PC5 root key is derived based on the master key, and/or (3) the one or more third keys are derived based on the PC5 root key.

3. The method of claim 1, further comprising:
   determining an identifier (ID) of the PC5 root key based on the master key obtained from the authenticating of the first WTRU,
   wherein the determining of the one or more third keys is based on the PC5 root key and the ID of the PC5 root key.

4. The method of claim 1, further comprising:
   before the authenticating of the first WTRU with the network, sending, to the second WTRU, a direct communication request message to establish a PC5 link with the second WTRU.

5. The method of claim 4, further comprising:
   after sending the direct security mode complete message, receiving, from the second WTRU, a direct communication accept message indicating establishment of the PC5 link with the second WTRU.

6. The method of claim 5, further comprising:
after receiving the direct communication accept message, communicating, with the network via the second WTRU, using the PC5 link.

7. A first wireless transmit/receive unit (WTRU) comprising:
a processor and a transceiver which are configured to:
authenticate, via a second WTRU, the first WTRU with a network,
determine a PC5 root key based on a master key obtained from the authenticating of the first WTRU,
receive, from the second WTRU, a first PC5 message protected based on the PC5 root key, wherein the first PC5 message is a direct security mode command message,
determine one or more third keys, including an encryption key and/or an integrity key, based on the PC5 root key, and
send, to the second WTRU, a second PC5 message, wherein the second PC5 message is a direct security mode complete message protected using at least one of the one or more third keys.

8. The first WTRU of claim 7, wherein any of: (1) the master key is derived from the authentication of the WTRU, (2) the PC5 root key is derived based on the master key, and/or (3) the one or more third keys are derived based on the PC5 root key.

9. The first WTRU of claim 7, wherein the processor is further configured to:
determine an identifier (ID) of the PC5 root key based on the master key obtained from the authenticating of the first WTRU,
wherein the determining of the one or more third keys is based on the PC5 root key and the ID of the PC5 root key.

10. The first WTRU of claim 7, wherein the processor and the transceiver are configured to:
before the authentication of the first WTRU with the network, send, to the second WTRU, a direct communication request message to establish a PC5 link with the second WTRU.

11. The first WTRU of claim 10, wherein the processor and the transceiver are configured to:
after sending the direct security mode complete message, receive, from the second WTRU, a direct communication accept message indicating establishment of the PC5 link with the second WTRU.

12. The first WTRU of claim 11, wherein the processor and the transceiver are configured to:
after receiving the direct communication accept message, communicate, with the network via the second WTRU, using the PC5 link.

13. A first wireless transmit/receive unit (WTRU) comprising:
a processor and a transceiver which are configured to:
forward authentication messages between a second WTRU and a network;
receive, from the network, a PC5 root key obtained based on authentication of the second WTRU;
send, to the second WTRU, a direct security mode command message, wherein the direct security mode command message is protected using one or more second keys, including an encryption key and/or an integrity key, based on the PC5 root key; and
receive, from the second WTRU, a direct security mode complete message, wherein the direct security mode complete message is protected using the one or more second keys.

14. The first WTRU of claim 13, wherein the direct security mode command message and the direct security mode complete message are PC5 messages, and wherein any of: (1) the PC5 root key indicates successful authorization of the second WTRU, and/or (3) the one or more second keys are derived based on the PC5 root key.

15. The first WTRU of claim 13, wherein the processor and the transceiver are configured to:
before forwarding the authentication messages, receive, from the second WTRU, a direct communication request message to establish a PC5 link with the second WTRU.

16. The first WTRU of claim 15, wherein the processor and the transceiver are configured to:
after receiving the direct security mode complete message, send, to the second WTRU, a direct communication accept message indicating establishment of the PC5 link with the second WTRU.

17. The first WTRU of claim 16, wherein the processor and the transceiver are configured to:
after sending the direct communication accept message, forward one or more transmissions, between the network and the second WTRU, using the PC5 link.

* * * * *